(12) United States Patent
Katoh et al.

(10) Patent No.: US 9,441,129 B2
(45) Date of Patent: Sep. 13, 2016

(54) INK FOR INKJET RECORDING, INK CONTAINER, AND INKJET RECORDING DEVICE

(71) Applicants: Keita Katoh, Shizuoka (JP); Mitsuru Naruse, Shizuoka (JP); Masayasu Nonogaki, Shizuoka (JP); Akihiko Matsuyama, Shizuoka (JP); Kazukiyo Nagai, Shizuoka (JP); Yuusuke Koizuka, Shizuoka (JP)

(72) Inventors: Keita Katoh, Shizuoka (JP); Mitsuru Naruse, Shizuoka (JP); Masayasu Nonogaki, Shizuoka (JP); Akihiko Matsuyama, Shizuoka (JP); Kazukiyo Nagai, Shizuoka (JP); Yuusuke Koizuka, Shizuoka (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/634,054

(22) Filed: Feb. 27, 2015

(65) Prior Publication Data

US 2015/0259555 A1  Sep. 17, 2015

(30) Foreign Application Priority Data

Mar. 12, 2014 (JP) .................................. 2014-048368

(51) Int. Cl.
*B41J 2/21* (2006.01)
*C09D 11/38* (2014.01)
(Continued)

(52) U.S. Cl.
CPC ................ *C09D 11/38* (2013.01); *B41J 2/175* (2013.01); *B41J 2/17523* (2013.01); *B41J 2/17553* (2013.01); *B41J 2/2107* (2013.01); *B41J 29/02* (2013.01); *C09D 11/322* (2013.01)

(58) Field of Classification Search
CPC ............ B41J 2/01; B41J 2/11; B41J 2/1433; B41J 2/17; B41J 2/17593; B41J 2/2107; B41J 2/1755; B41J 2/2114; B41J 11/0015; B41J 11/002; B41J 2/2056; B41J 2/21; B41J 2/0057; B41J 3/60; C09D 11/36; C09D 11/40; C09D 11/30; C09D 11/38; C09D 11/322; C09D 11/328; C09D 11/101; C09D 11/005; C09D 11/54; C09D 11/52; B41M 5/0011; B41M 5/0017; B41M 7/00; B41M 7/0072; B41M 5/52; B41M 5/5218
USPC ............ 347/95–105; 106/31.6, 31.13, 31.27; 523/160, 161
See application file for complete search history.

(56) References Cited

U.S. PATENT DOCUMENTS

| | | | |
|---|---|---|---|
| 5,851,280 A | 12/1998 | Belmont et al. | |
| 2004/0063597 A1* | 4/2004 | Adair | C11D 3/0015 510/276 |

(Continued)

FOREIGN PATENT DOCUMENTS

| | | |
|---|---|---|
| JP | 58-222095 | 12/1983 |
| JP | 2007-238798 | 9/2007 |

(Continued)

*Primary Examiner* — Manish S Shah
(74) *Attorney, Agent, or Firm* — Cooper & Dunham LLP

(57) ABSTRACT

An ink for inkjet recording contains water, an organic solvent, a pigment, and a compound represented by the following Chemical formula 1:

Chemical formula 1

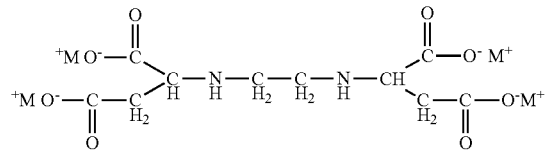

In Chemical formula 1, $M^+$'s each, independently represent protons, cations of alkali metals, ammonium ions, or organic ammonium ions.

7 Claims, 4 Drawing Sheets

(51) Int. Cl.
*B41J 2/175* (2006.01)
*C09D 11/322* (2014.01)
*B41J 29/02* (2006.01)

(56) References Cited

U.S. PATENT DOCUMENTS

| | | | |
|---|---|---|---|
| 2004/0166252 A1* | 8/2004 | Takashima | B41M 5/5218 428/32.1 |
| 2009/0202744 A1* | 8/2009 | Tsubaki | C09D 11/101 427/595 |
| 2010/0076134 A1* | 3/2010 | Yoshida | C09D 11/30 524/270 |
| 2014/0002539 A1 | 1/2014 | Goto et al. | |
| 2014/0072779 A1 | 3/2014 | Matsuyama et al. | |
| 2014/0120331 A1 | 5/2014 | Koizuka et al. | |
| 2014/0141209 A1 | 5/2014 | Koizuka et al. | |
| 2014/0199530 A1 | 7/2014 | Katoh et al. | |
| 2014/0242352 A1 | 8/2014 | Naruse et al. | |

FOREIGN PATENT DOCUMENTS

| | | |
|---|---|---|
| JP | 2009-513802 | 4/2009 |
| JP | 2011-157425 | 8/2011 |
| JP | 2012-207202 | 10/2012 |
| WO | WO01/51566 A1 | 7/2001 |
| WO | WO2007/053563 A2 | 5/2007 |

* cited by examiner

INK FOR INKJET RECORDING, INK CONTAINER, AND INKJET RECORDING DEVICE

CROSS-REFERENCE TO RELATED APPLICATIONS

This patent application is based on and claims priority pursuant to 35 U.S.C. §119(a) to Japanese Patent Application No. 2014-048368, filed on Mar. 12, 2014, in the Japan Patent Office, the entire disclosure of which is hereby incorporated by reference herein.

BACKGROUND

1. Technical Field

The present invention relates to ink for ink jet recording, an ink container, and an ink jet recording device.

2. Background Art

Description the Background Art

Since inkjet recording is advantageous as image forming method in comparison with other recording methods in that the process is simple, full colorization is easy, and images having high resolution can be obtained by a simple structure, the inkjet recording has been diffusing. In inkjet recording, inkjet recording devices form images on recording media, typically paper, by firing a small amount of ink to deposit it on the recording medium. The utilization of inkjet recording spreads to printers or printing for personal use or industrial use.

The main stream of the ink is an aqueous ink using hydrosoluble dyes as colorants. However, the dye inks are inherently inferior in weathering property and water resistance.

Therefore, pigment inks using pigments instead of hydrosoluble dyes have been researched. However, the pigment inks are inferior to dye inks with regard to coloring, ejection stability of ink, and storage stability. In addition, as the technologies for producing quality images by printers for office use are improved, the pigment ink is required to have the same image density as the dye ink.

However, the pigment ink involves a problem that when plain paper is used, the pigment density on the surface of the paper lowers because the pigment permeates into paper. In attempts to increase the drying speed of an ink attached to a recording medium as a measure for high speed performance, a permeating agent is added to the ink to permeate water into the recording medium for quick drying but the permeating property of the pigment is also improved, thereby further lowering the image density.

SUMMARY

According to the present disclosure, an improved ink for inkjet recording is provided which contains water, an organic solvent, pigment; and a compound represented by the following Chemical formula 1:

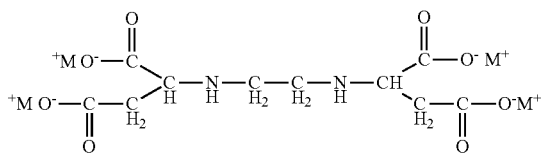

Chemical formula 1

In Chemical formula 1, M⁺'s each, independently represent protons, cations of alkali metals, ammonium ions, or organic ammonium ions.

BRIEF DESCRIPTION OF THE SEVERAL VIEWS OF THE DRAWINGS

Various other objects, features and attendant advantages of the present invention will be more fully appreciated as the same become better understood from the detailed description when considered in connection with the accompanying drawings, in which like reference characters designate like corresponding parts throughout and wherein.

DETAILED DESCRIPTION

Figure 1:
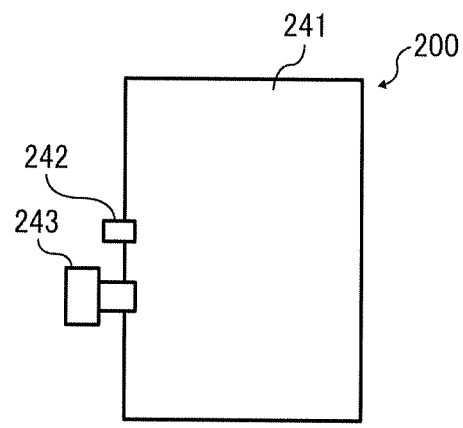
FIG. 1 is a schematic diagram illustrating an example of an ink container according to an embodiment of the present invention.

According to the present disclosure, an ink for inkjet recording is provided which produces images having a high density on plain paper, reduces the occurrence of strike-through of images, and has a high ejection reliability.

Embodiments of the present disclosure include: 1: an ink for inkjet recording is provided which contains water, an organic solvent, pigment; and a compound represented by the following Chemical formula 1:

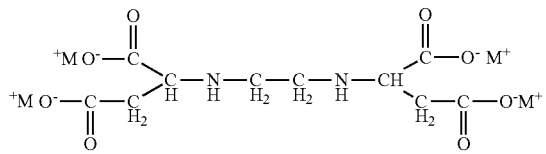

Chemical formula 1

In Chemical formula 1, M⁺'s each, independently represent protons, cations of alkali metals, ammonium ions, or organic ammonium ions.

The ink for inkjet recording of 1 mentioned above is described in detail. Since the following 2 to 9 are contained in the embodiments of the present invention, these are also described.

2. The ink for inkjet recording according to 1 mentioned above, satisfying one of the following I to III:

I. the pigment which is dispersed by a dispersant having one or more kinds of hydrophilic group;

II. the pigment which is covered with a resin having one or more kinds of hydrophilic group; and III. the pigment to which one or more kinds of hydrophilic group, an atomic group having one or more kinds of hydrophilic group, or a resin having one or more kinds of hydrophilic group is bonded.

3. The ink for inkjet recording according to 2, wherein the hydrophilic group is a phosphoric acid group or a phosphonic acid group.

4. The ink for inkjet recording according to 2 or 3 mentioned above, wherein the hydrophilic group is a bisphosphonic acid group.

5. The ink for inkjet recording according to any one of 1 to 4 mentioned above, wherein $M^+$'s each, independently represent protons, cations of alkali metals, ammonium ions, or organic ammonium ions.

6. The ink for inkjet recording according to any one of 1 to 5 mentioned above, wherein the compound represented by Chemical formula 1 accounts for 0.1% by weight to 15.0% by weight in the ink for ink for inkjet recording.

7. The ink for inkjet recording according to any one of 1 to 6 mentioned above, wherein pH of the ink for inkjet recording ranges from 7.0 to 10.0 at 25° C.

8. An ink container including: a container to accommodate the ink for inkjet recording of any one of 1 to 7 mentioned above.

9. An inkjet recording device including: the ink container of 8 mentioned above.

In general, chelator compounds or salts thereof dissolve a calcium salt such as calcium carbonate and calcium sulfate, which are little soluble.

Therefore, by adding a chelator compound to an ink, the elution amount of calcium ion from paper can be increased when the ink is deposited on the paper.

However, typical chelators have extremely strong affinity with calcium ions so that the calcium ions eluted strongly bond with chelator compounds. Therefore, pigments do not agglomerate even when the dispersability of the pigments is lowered as a result of reaction with functional groups (hydrophilic groups) that disperse the pigments, so that the image density is not improved.

As a result of an investigation to solve this problem, it was found that, by using the compound represented by Chemical formula 1 as an additive of an ink, both an increase of elution amount of calcium ion from paper and reactivity of hydrophilic functional groups that disperse eluted calcium ions and pigments were secured.

Consequently, it was found that the image density becomes high and the occurrence of strike-through is reduced even for plain paper having a low content ratio of hydrosoluble multivalent metal salts or only little-soluble metal salts.

Furthermore, it was also found that ejection reliability is high because pigments agglomerate as a result of reaction between ink and paper without causing agglomeration of the pigments prior to ejection of the ink and the pigments dried at nozzles do not easily agglomerate.

EDDS and Neutralizing Agent

The compound represented by Chemical formula 1 for use in embodiments of the present disclosure contains (S,S)-ethylene diamine disuccinic acid (hereinafter also referred to as EDDS), and alkali metal salts, ammonium salts, and organic ammonium salts thereof. (S,S)-ethylene diamine disuccinic acid is available on market as (S,S)-ethylene diamine disuccinic acid trihydrate under the name of CHELEST EDDS-4H (manufactured by Chelest Corporation).

In the Chemical formula 1, $M^+$'s each, independently represent protons, cations of alkali metals, ammonium ions, or organic ammonium ions.

Specific examples of the cations of alkali metals include, but are not limited to, lithium carbonate, sodium carbonate, and potassium carbonate.

$M^+$ in the Chemical formula 1 is preferably a proton or an organic ammonium ion.

(S,S)-ethylene diamine disuccinic acid can be added to an ink as the compound represented by Chemical formula 1 after (S,S)-ethylene diamine disuccinic acid is neutralized by alkali metal hydroxide such as sodium hydroxide, potassium hydroxide, and lithium hydroxide, ammonium, or an organic amine.

By this neutralization, $M^+$ in the Chemical formula 1 becomes a cation of an alkali metal, an ammonium ion, or an organic ammonium ion. The ratio thereof depends on the conditions such as the amount of a neutralizing agent, pH of a solvent, identity, and temperature.

In the present disclosure, the compound represented by Chemical formula 1 preferably takes an organic ammonium ion partially with a proton or simply an organic ammonium ion as $M^+$.

If neutralization ratio means the ratio of $M^+$ being replaced with a cation of an alkali metal or an organic ammonium ion, the neutralization is preferably 70% or more.

When the neutralization ratio is 70% or more, ejection reliability is improved.

Specific examples of the neutralizing agent to produce an organic ammonium ion include, but are not limited to, bases that produces a quaternary ammonium ion such as tetraethyl ammonium hydroxide, and tetrabutyl ammonium hydroxide; alkyl amines such as mono, di-, or tr-methyl amine, and mono, di-, or tri ethyl amine; alcohol amines such as ethanol amine, diethanol amine, triethanol amine, methyl ethanol amine, methyl diethanol amine, dimetyl ethanol amine, monopropanol amine, dipropanol amine, tripropanol ammonium amine, isopropanol ammoium amine, trishydroxy methyl aminomethane, and 2-amino-2-ethyl-1,3-propane diol (AEPD); cyclic amines such as choline, morpholine, N-methyl morpholine, N-methyl-2-pyrolidone, and 2-pyrolidone. Of these, tetraethyl ammonium hydroxide is particularly preferable.

Pigment

The pigment for use in the present disclosure is (I): a pigment that is dispersed by a dispersant having one or more kinds of hydophilic group (meaning that an ink for inkjet recording contains a dispersant having one or more kinds of hydophilic group), (II): a pigment which is covered with a resin having one or more kinds of hydophilic group, and (III): the pigment to which one or more kinds of hydrophilic group, an atomic group having one or more kinds of hydrophilic group, or a resin having one or more kinds of hydrophilic group is bonded.

The pigment mentioned in (I) is generally referred to as a surfactant dispersion pigment or a resin dispersion pigment. The dispersant takes the interface between the pigment and water to disperse the pigment.

The pigment mentioned in (II) is referred to as a capsule pigment, which is covered with a hydrophilic and hydro insoluble resin. The pigment is dispersed in water by being hydrophilized at the resin layer of the surface of the pigment.

The pigment mentioned in (III) is referred to as self-dispersible pigment. Mainly, carbon black is subject to surface oxidation treatment to be hydrophilic so that the pigment itself is dispersed in water.

Hydrophilic Group

The hydrophilic group for use in the ink for inkjet recording of the present disclosure can be the following functional groups or have the following hydrophilic group but are not limited thereto.

—COOX, —$SO_3X$, —$PO_3HX$, —$PO_3X_2$, —$CONX_2$, —$SO_3NX_2$, NH—$C_6H_4$—COOX, —NH—$C_6H_4$—$SO_3X$, —NH—$C_6H_4$—$PO_3HX_2$, —NH—$C_6H_4$—$PO_3X_2$, —NH—$C_6H_4$—$CONX_2$, —NH—$C_6H_4$—$SO_3NX_2$, —$OPO_3HX$, —$OPO_3X_2$ (where X represents a hydrogen atom, an alkali metal, a quaternary ammonium or organic ammonium).

Of the hydrophilic groups, a phosphoric acid group and a phosphonic acid group are preferable and having two phosphonic acid groups (bisphosphonic acid group) is particularly preferable.

Dispersant

The dispersant for pigments for use in the ink for inkjet recording of the present disclosure can be a surfactant type dispersant having a hydrophilic group and a resin dispersant having a hydrophilic group.

As the dispersant for use in the present disclosure, a resin dispersant having a phosphoric acid group or a phosphonic acid group is preferable and a resin dispersant having a bisphosphonic acid group is more preferable. When the dispersant is used for an ink, a high image density is obtained and the density of strike-through can be reduced.

The content of the dispersant for use in the ink for inkjet recording is not particularly limited and can be determined to a particular application. The content is preferably from 1 part by weight to 100 parts by weight and more preferably from 5 parts by weight to 80 parts by weight based on 100 parts by weight of the pigment.

The pigment can have the most suitable particle diameter within this range, which makes the image density, dispersability, and storage stability in suitable ranges.

In addition, it is possible to use two or more kinds of dispersants in a range in which such properties are not degraded.

Dispersion of pigments by a dispersant can be conducted by, for example, a sand mill, a homogenizer, a ball mill, a bead mill, a paint shaker, an ultrasonic dispersing machine, etc.

Examples of the surfactant type dispersant are, for example, anionic surfactants, cationic surfactants, nonionic surfactants, amphoteric surfactants, etc.

Examples of resin dispersants are homopolymers, copolymers, terpolymers, and polymers having many different kinds and arbitrary number of repeating units.

Furthermore, such polymers can be random polymers, branched polymers, alternating polymers, craft polymers, block polymers, star-like form polymers, and comb-like form polymers. These can be used alone or in combination.

Specific examples of the anion surfactants include, but are not limited to, alkyl sulfocarboxylix acid salts, α-olefin sulfonic acid salts, polyoxyethylene alkyl ether acetic acid salts, N-acyl amino acid and salts thereof, N-acyl methyl taurine salts, polyoxyalkylether sulfuric acid salts, polyoxyethylene alkyl ether phosphoric acid salts, rosin acid soap, castor oil sulfuric acid ester salts, lauryl alcohol sulfuric acid ester salts, alkyl phenol type phosphotic acid esters, formalin condensation products of naphthalene sulfonic acid salts, alkyl type phosphoric acid esters, alkyl aryl sulfonic acid salts, diethyl sulfosuccinic acid salts, diethyl hexyl sulfosuccinic acid salt, and dioctyl sulfosuccinic acid salts.

Specific examples of the cation surfactants include, but are not limited to, 2-vinylpyridine derivatives and poly-4-vinylpyridine derivatives.

Specific examples of the amphoteric surfactants include, but are not limited to, lauryl dimethylamino acetic acid betaine, 2-alkyl-N-carboxymethyl-N-hydroxyethyl imidazolinium betaine, coconut oil fatty acid amidepropyl dimethyl amino acetic acid betaine, polyoctyl polyaminoethyl glycine, and imidazoline derivatives.

Specific examples of the nonionic surfactants include, but are not limited to, the following:

ether-based surfactants such as polyoxyethylene nonyl phenyl ethers, polyoxyethylene octylphenyl ethers, polyoxyethylene dodecyl phenyl ethers, polyoxyethylene lauryl ethers, polyoxyethylene oleyl ethers, polyoxyethylene alkyl ethers, polyoxyethylene-β-naphtyl ether, and polyoxy allyl alkylethers;

ester-based surfactants such as polyoxyethylene oleic acid esters, polyoxyethylene oleic acid esters, polyoxyethylene distearic acid esters, sorbitan laurate, sorbitan monostearate, sorbitan monooleate, sorbitan sesquioleate, polyoxyethylene monooleate, and polyoxyethylene stearate; and acetylene glycol-based surfactants such as 2,4,7,9-tetramethyl-5-desine-4,7-diol, 3,6-dimethyl-4-octine-3,6-diol, and 3,5-dimethyl-1-hexine-3-ol.

Specific examples of the resin dispersants include, but are not limited to, homopolymers or copolymers of monomers, vinyl monomers, acrylamide monomers, methacylamide monomers, acrylate ester monomers, methacrylate monomer ester monomers, vinyl ester monomers, vinyl ether monomers, or styrene monomers having hydrophilic functional groups (hydrophilic groups) such as a carboxyl group, a sulfonic acid group, phosphoric acid group, and a phosphonic acid group. In addition, copolymers obtained by polymerizing the monomers specified above with ethylenic unsaturated monomers can be used.

Specific examples of ethylenic unsaturated monomers include, but are not limited to, styrene, α-methyl styrene, dimethyl styrene, tert-butyl styrene, chloro styrene, benzyl (meth)acrylate, phenyl(meth)acrylate, phenyl ethyl(meth) acrylate, phenyl propyl(meth)acrylate, phenoxyethyl(meth) acrylate, methyl(meth)acrylate, ethyl(meth)acrylate, n-propyl(meth)acrylate, iso-propyl(meth)acrylate, n-butyl (meth)acrylate, iso-butyl(meth)acrylate, tert-butyl(meth) acrylate, 2-ethylhexyl(meth)acrylate, n-octyl(meth)acrylate, dodecyl(meth)acrylate, octadecyl(meth)acrylate, cyclhexyl (meth)acrylate, isoborny(meth)acrylate, 2-hydroxyethyl (meth)acrylate, 2-hydroxypropyl(meth)acrylate, methoxy polyethylene glycol mono(meth)acrylate, and methoxypoly (oxyethylene oxypropylene)glycol mono(meth)acrylate.

In addition, polymers obtained by polymerizing the monomers having hydrophilic groups with monomers having hydrophobic groups can be used.

Specific examples of the monomers having hydrophobic groups include, but are not limited to, 1-vinylnaphthalene, 2-vinyl naphthalene, benzyl acrylate, benzyl methacrylate, plnetyl methacrylate, cyclohexyl acrylate, cyclohexyl methacrylate, dodecyl acrylate, dodecyl methacrylate, hexadecanyl acrylate, hexadecanyl methacrylate, octadecanyl acrylate, octadecanyl methacrylate, icosanyl acrylate, icosanyl methacrylate, docosanyl acrylate, and docosanyl methacrylate.

The polymerization ratio of the monomer having a hydrophilic group and the monomer having a hydrophobic group preferably ranges from 10% by weight:90% by weight to 20% by weight:80% by weight.

The resin dispersant is synthesized by known synthesis methods such as solution polymerization, suspension polymerization, lump form polymerization, and emulsion polymerization. In terms of polymerization operation and ease of molecular weight control, methods using radical polymerization initiators are preferable.

Specific examples of the radical polymerization initiator include, but are not limited to, known initiators such as peroxy ketal, hydroperoxide, dialkyl peroxide, diacylperoxide, peroxydicarbonate, peroxyester, cyano-based azobisisobutylonitrile, azobis(2-methylbutylonitrike), azobis(2, 2'-isovaleronitrile), and non-cyano-based dimethyl-2, 2'azobis isobutylate. Of these, organic peroxides and azo-based compounds are preferable in terms of the ease of control of molecular weight and low dissolution temperature. In particular, azo-based compounds are more preferable. The amount of polymerization initiator is preferably from 1% by weight to 10% by weight to the total weight of the polymerizable monomers.

In addition, part or the entire of the hydrophilic group in the resin dispersant is preferably ionized by neutralization by base.

Specific examples of the base for neutralization include, but are not limited to, alkali metal hydroxides such as lithium hydroxide, sodium hydroxide, and potassium oxide, ammonium, organic amines such as mono, di-, or tri-methyl amine, and mono, di-, or tri-ethyl amine, monoethanol amine, diethanol amine, triethanol amine, methylethanol amine, methyl diethanol amine, dimetyl ethanol amine, choline, amino ethane propane diol, monopropanol amine, dipropanol amine, tripropanol amine, isopropanol amine, trishydroxymethyl aminomethane, aminoethyl propane diol, tetramethyl ammonium, tetraethyl ammonium, and tetrabutyl ammonium, and cyclic amines such as morpholine, N-methyl morpholine, N-methyl-2-pyrolidone, and 2-pyrolidone.

Other resin dispersants are available on market.

These are available from BASF, Nagase ChemteX Corporation, TOAGOSEI CO., LTD., Mitsubishi Rayon Co., Ltd., SUMITOMO SEIKA CHEMICALS CO., LTD., JSR Corporation, Showa Denko K.K., Arakawa Chemical Industries, Ltd., NIPPON SHOKUBAI CO., LTD., The Nippon Synthetic Chemical Industry Co., Ltd., and KURARAY CO., LTD.

Capsule Pigment

The capsule pigment for use in the ink for inkjet recording of the present disclosure can be stably dispersed in a solvent without using a dispersant because it is micro-capsulated by coverage by a resin having one or more kinds of hydrophilic group for microcapsulation.

As the resin of the capsule dispersant for use in the present disclosure, a resin having a phosphoric acid group or a phosphonic acid group is preferable and a resin having a bisphosphonic acid group is more preferable.

In addition, like the hydrophilic group of the resin dispersant, part or the entire of the hydrophilic group in the resin of the capsule pigment is preferably ionized by neutralization by base.

When the resin of the capsule pigment is used for an ink, a high image density is obtained and the density of strike-through can be reduced.

Specific examples of the resin that covers a pigment include, but are not limited to, polyamide, polyurethane, polyester, polyurea, epoxy resins, polycarbonate, urea resins, melamine resins, phenol resins, polysaccharides, gelatine, gum arabic, dextran, casein, protein, natural rubber, carboxy polymethylene, polyvinyl alcohol, polyvinyl pyrolidone, polyvinyl acetate, polyvinyl chloride, polyvinylidene chloride, cellulose, ethyl cellulose, methyl cellulose, nitro cellulose, hydroxyethyl cellulose, cellulose acetate, polyethylene, polystyrene, polymers or copolymers of (meth)acrylic acid, polymers or copolymers of (meth)acrylic acid esters, copolymers of (meth)acrylic acids-(meth)acrylic acid esters, copolymers of styrene-maleic acid, sodium alginate, aliphatic acid, paraffin, bee wax, water wax, hardened beef tallow, carnauba wax, and albumin.

In addition, it is preferable to use nonionic organic polymer materials as the material for resins with which pigments are coated.

Specific examples of the nonionic organic polymer materials include, but are not limited to, polyvinyl alcohol, polyethylene glycol monomethacrylate, polypropylene glycol monomethacyrlate, methoxypolyethylene glycol monomethacrylate, (co)polymers thereof, and cation ring-open polymers of 2-oxazoline. In particular, completely saponified polyvinyl alcohol is little soluble in water so that it is easily soluble in hot water but not in cold water, which is particularly preferable.

Hydroinsoluble pigments can be microcapsulated by covering with organic polymer materials by any of known methods. For example, chemical manufacturing methods, physical manufacturing methods, physical-chemical manufacturing methods, and mechanical manufacturing methods can be used. Specific examples thereof include, but are not limited to, interfacial polymerization methods, in-situ polymerization methods, submerged cured coated film method, coacervation (phase separation) methods, solvent evaporation methods, melting distribution cooling methods, air suspension coating methods, spray drying methods, an acid deposition method, and a phase-transfer emulsification methods.

Microcapsulation is briefly descried below.

Interfacial polymerization method (a method of dissolving two kinds of monomers or reactants in a dispersion phase and a continuous phase separately followed by reaction at the interface therebetween to form a wall film);

In-situ polymerization method (a method of supplying a liquid or gas monomer and a catalyst or two kinds of reactive materials from one side of the continuous phase nuclear particle side to conduct reaction to form a wall film);

Method of coating by curing in liquid (a method of forming a wall film by causing droplets of a polymer solution containing core material particles to be un-dissolved in liquid by a curing agent, etc.);

Coacervation (phase separation) method (a method of forming a wall film by separating a polymer liquid dispersion in which core material particles are dispersed into coacervate (dense phase) having a high polymer concentration and a diluted phase);

Method of drying in liquid (a method of forming a wall film by preparing a liquid dispersion in which a core material is dispersed in a wall-film liquid material and charging the liquid dispersion in a liquid in which the continuous phase of the liquid dispersion is not mixable to obtain a complex emulsion to gradually remove the medium in which the wall-film material is dissolved);

Melting dispersion cooling method (a method of forming a wall film by heating and liquidizing a wall-film material which is liquidized by heating and solidified at room temperature to disperse core material particles therein and make fine particles from them followed by cooling-down);

Method of suspension coating in air (a method of forming a wall film by suspending core material particles of powder in air by a fluid bed and mixing coating liquid of the wall-film material by spraying while floating the core material particles in air stream); and Spray drying method (a method of forming a wall film by spraying an encapsulating raw liquid to contact heated wind to vaporize and dry the volatile portion thereof).

Acid deposition method (a method of neutralizing by a basic compound at least a part of the anionic group of an organic polymer compound having an anionic group to impart hydrosolubility, mixing and kneading it with a coloring material in an aqueous medium, and neutralizing or acidizing the resultant by an acidic compound to precipitate the organic compound to fixate it on the coloring material followed by neutralization for dispersion);

Phase transfer emulsification method (a method of charging water in an organic solvent phase of a mixture containing an anionic organic polymer having a dispersion power for water and a coloring material or charging the organic solvent phase in water.

Incidentally, it is preferable to select organic polymers suitable for the selected microcapsulation method.

For example, polyesters, polyamides, polyurethanes, polyvinyl pyrolidone, and epoxy resins are suitable for the interfacial polymerization method. Polymers or copolymers of (meth)acrylic acid esters, copolymers of (meth)acrylic acids-(meth)acrylic acid esters, copolymers of styrene-(meth)acrylic acid, polyvinyl chloride, polyvinylidene chloride, and polyamides are suitable for the in-situ polymerization method. Sodium alginate, polyvinyl alcohol, gelatin, albumin, and epoxy resins are suitable for the method of drying in liquid. Gelatin, celluloses, and casein are suitable for the coacervation method. In addition, to obtain fine and homogeneous microcapsulated pigments, known capsulation methods can be used in addition to the methods described above.

When the phase transfer emulsification method or the acid deposition method is selected as the microcapsulation method, anionic organic polymers are used as the organic polymer constituting the wall film materials of microcapsules.

Microcapsulation in the phase transfer emulsification method is conducted by processing self dispersion (phase transfer emulsification) by charging water in an organic solvent phase of a complex material or complex element of an anionic organic polymer having a self dispersion power or dissolution power to water with carbon black or a mixture of carbon black, a curing agent, and an anionic organic polymer or charging the organic solvent phase in water. Incidentally, this carbon black includes a self-dispersion type carbon black. A vehicle for recording liquid or an additive is mixed in the organic solvent phase without a problem in the phase transfer emulsification method. In particular, in terms of manufacturing a liquid dispersion of recording liquid in a direct manner, it is preferable to mix the liquid medium of the recording liquid.

On the other hand, in the acid deposition method, microcapsulation is conducted by neutralizing by a basic compound part or the entire of anionic group of a water-containing cake obtained by a manufacturing method including a process of neutralizing part or the entire of the anionic group of an organic polymer having an anionic group with a basic compound followed by mix-kneading with a colorant such as carbon black in an aqueous medium and a process of precipitating and fixating the organic polymer having an anionic group on a pigment by conducting neutralization or acidization with an acidic compound to make the pH to be 7 or lower. Using such a method, an aqueous liquid dispersion containing fine anionic microcapsulated pigments containing a quantity of pigments can be manufactured.

Specific examples of the solvent for use in microcapsulation include, but are not limited to, alkyl alcohols such as methanol, ethanol, propanol, and butanol; aromatic hydrocarbons such as benzole, toluole, and xylol; esters such as methyl acetate, ethyl acetate, and butyl acetate; chlorinated hydrocarbons such as chloroform and ethylene dichloride; ketones such as acetone, and methylisobutyl ketone; ethers such as tetrahydrofuran and dioxane; and cellosolves such as methyl cellosolve and butyl cellosolve. It is also possible to obtain the ink for inkjet recording of the present disclosure by separating microcapsules prepared by the methods described above from these solvents once by centrifugal or filtration followed by stirring and re-dispersion with water and optional solvents.

The average particle diameter of capsulated pigments obtained by the methods described above is preferably from 50 nm to 180 nm.

Self Dispersion Pigment

The self dispersion pigment for use in the ink for inkjet recording of the present disclosure is one of the following.

Surface-reformed pigments to which one or more kinds of hydrophilic group is directly bond.

Surface-reformed pigments to which an atomic group having one or more kinds of hydrophilic group is bonded.

Surface-reformed pigments to which a resin having one or more kinds of hydrophilic group is bonded.

Specific examples of the atomic group having one or more hydrophilic group include, but are not limited to, a group represented by Chemical formula 2, a group represented by Chemical formula 3, and partial esters or salts thereof. In Chemical formula 2 or 3, $Q_1$ and $Q_2$ each, independently represent H, R, OR, SR, or $NR_2$, where R's each, independently represent hydrogens, saturated or unsaturated and branched or non-branched alkyl groups having 1 to 18 carbon atoms, substituted or non-substituted and branched or non-branched acyl groups having 1 to 18 carbon atoms, aralkyl groups, alkaryl groups, or aryl groups. Preferably, $Q_1$ and $Q_2$ independently represents H, R, OR, SR, or $NR_2$, where R's each, independently represent hydrogens, alkyl groups having 1 to 6 alkyl groups, or aryl groups. More preferably, $Q_1$ and $Q_2$ are H, OH, or $NH_2$.

Furthermore, the atomic group contains a group represented by Chemical formula 4, Chemical formula 5, or partial esters of salts thereof (where $Q_1$ and $Q_2$ are the same as the specified above with n of from 0 to 9, for example 1 to 9). Preferably, n ranges from 0 to 3, for example, from 1 to 3, and, more preferably, 0 or 1. Furthermore, the atomic group optionally contains a group represented by Chemical formula 6, Chemical formula 7, or partial esters of salts thereof, where $Q_1$, $Q_2$, and n are the specified above and X represents an arylene group, a heteroarylene group, an alkylene group, a vinylidene group, an alkarylene group, an aralkylene group, or a cyclic or heterocyclic group. For example, X can be an arylene group, for example, phenylene, naphthalene, or biphenylene group (which can be substituted by an arbitrary group such as one or more alkyl group or aryl group). When X is an alkylene group, for example, a substituted or non-substituted alkylene group can be selected and can be branched or non-branched and substituted by one or more group (for example, an aromatic group). Specific examples thereof include, but are not limited to, a group having 1 to 12 carbon atoms, for example, a methylene group, an ethylene group, a propylene group, or a butylene group.

Chemical formula 2

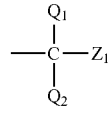

Chemical formula 3

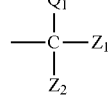

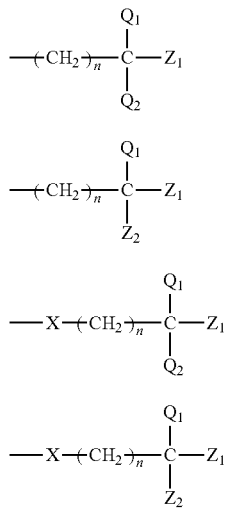

Chemical formula 4

Chemical formula 5

Chemical formula 6

Chemical formula 7

In the Chemical formulae, $Z_1$ and $Z_2$ represent hydrophilic groups.

For surface reforming, a particular functional group (functional group such as sulfonic acid group, carboxyl group, phosphoric acid group, and bisphoeophonic acid group) is chemically bonded with the surface of the pigment or the surface is wet-oxidized using at least one of hypohalous acid or a salt thereof.

In an example of the manufacturing method by wet-oxidization treatment of pigments to which one or more kinds of hydrophilic group is bonded, acidic carbon black is used.

"acidic carbon black" has acidity because of a carboxyl group present on the surface of a carbon black particle. It is preferable to use an acidic carbon black having a pH of 6 or less, in particular 4 or less, for an aqueous pigment ink. Acidic carbon black is obtained by moderately oxidizing carbon black for color such as furness black or channel black by an oxidization method using a typical oxidizing agent (such as nitric acid, ozone, hydrogen peroxide, and nitrogen oxide,) or a surface reforming method such as plasma treatment.

Specific examples of such acidic carbon black available on market include, but are not limited to, MA100, 2400B, and MA8 (all manufactured by Mitsubishi Chemical Corporation) and ColorBlack FW200 (manufactured by Degussa AG). To oxidize the thus-obtained acidic carbon black, a hypohalous acid salt is used. To be specific, sodium hypochlorite and potassium sodium hypochlorite are used. Sodium hypochlorite is particularly preferable in terms of reactivity. Oxidation of acidic carbon black is generally conducted by placing acidic carbon black and a hypohalous acid salt (for example, sodium hypochlorite) having an effective halogen concentration of from 10% to 30% to the mass of the carbon black in water followed by stirring for five hours or more, preferably about 10 to about 15 hours at 50° C. or higher, preferably from 95° C. to 105° C. The thus-obtained carbon black contains a surface active hydrogen content of 1.5 mmol/g or more. Thereafter, the produced material is filtered and the by-product salt is removed by washing with deionized water. Furthermore, the result is refined and condensed by using a reverse osmosis membrane or ultrafiltration membrane having an opening size of 0.01 μm or less.

Condensation is in general conducted in such a manner that the content ratio of carbon black ranges from about 10% by weight to 30% by weight to water to obtain a dense pigment liquid dispersion. The thus-obtained pigment liquid dispersion is used as an aqueous pigment ink as is. It is preferable that the concentration of carbon black is 1% by weight to 20% by weight.

The methods of chemically bonding a particular functional group (functional group such as sulfonic acid group, carboxyl group, phosphoric acid group, and bisphoeophonic acid group) on the surface of the pigment are as follows:

For example, U.S. Pat. No. 5,851,280 discloses a method of bonding an organic group to the surface of a pigment (for example, bond by diazonium reaction in a case in which part of diazonium salt is an organic group). The thus-obtained surface reforming pigment can be used for various purposes such as ink, inkjet ink, paint, toner, plastic, and rubber. WO01/51566 pamphlet discloses a manufacturing method of reforming materials in which a first chemical group is reacted with a second chemical group to form a pigment in which a third chemical group is bonded.

The first chemical group contains at least one nucleophile and the second chemical group contains at least one electrophile or the other way around. These pigments are used for ink compositions, in particular inkjet ink compositions.

Examples of the resins are homopolymers, copolymers, terpolymers, and polymers having many different kinds and arbitrary numbers of repeating units. Furthermore, polymers can be random polymers, branched polymers, alternating polymers, graft polymers, block polymers, star-like form polymers, and/or comb-like form polymers.

As the resin of the self dispersion pigment for use in the present disclosure, a resin having a phosphoric acid group or a phosphonic acid group is preferable and a resin having a bisphosphonic acid group is more preferable.

In addition, like the hydrophilic group of the resin dispersant, part or the entire of the hydrophilic group in the resin of the self dispersion pigment is preferably ionized by neutralization by base.

When the resin of the self dispersion pigment is used for an ink, a high image density is obtained and the density of strike-through can be reduced.

Ink for Inkjet Recording

The ink of the present disclosure contains water, an organic solvent, a pigment, and the compound represented by Chemical formula 1. It optionally contains other optional components.

There is no specific limit to the content of the compound represented by Chemical formula 1 in the ink and it can be suitably determined to a particular application. The content ratio is preferably from 0.1% by weight to 15.0% by weight and more preferably from 1.0% by weight to 5.0% by weight to the mass of the ink. Within the preferable range, a high image density is obtained and the ejection reliability of the ink is good.

There is no specific limit to pH of the ink of the present disclosure at 25° C. The pH can be determined to a particular application. It preferably ranges from 7.0 to 10.0. Within the preferable range, the ejection reliability of the ink is good.

It is preferable that the ink of the present disclosure is used for paper having an eluted amount of Calcium ion of from $1.0 \times 10^{-4}$ to $5.0 \times 10^{-4}$ (g/g). When the calcium ion is $1.0 \times 10^{-4}$ or higher, the image density is improved by reaction and agglomeration with hydrophilic groups so that permeation of the ink to paper is not inhibited, thereby improving drying property of ink, abrasion resistance, and marker resistance.

The calcium ion eluted from paper is calculated according to the following manner.

Paper is cut to pieces having a size of 2.0 cm to 3.0 cm×3.0 cm to 4 cm followed by filtration by highly pure water with a cellulose acetate filter (manufactured by Advantec MFS, Inc.) having a hole size of 0.8 µm to remove foreign objects. Thereafter, the pieces of paper are dipped in highly pure water and the calcium ion contained in dipping liquid is quantified by inductively coupled plasma (ICP) atomic emission spectrophotometer. The mass of the highly pure water is multiplied by the thus-obtained calcium ion concentration (ppm) followed by dividing with the mass of the paper dipped to calculate the amount of eluted calcium ion (g/g). The ratio (mass of paper/mass of the highly pure water in which the paper is dipped) of the mass of the paper to the mass of the highly pure water in which the paper is dipped is 8 (g)/100 (g).

For example, the amount of calcium ion of MyPaper (manufactured by Ricoh Company Ltd.) is $4.3 \times 10^{-4}$ (g/g) and that of Xerox4024 (manufactured by Xerox Corporation) is $1.7 \times 10^{-4}$ (g/g).

Water

Specific examples of water for use in the present disclosure include, but are not limited to, deionized water, ultra-filtered water, Mill Q water, pure water such as distilled water, highly pure water, and ultra pure water.

The content of water is preferably from 20% by weight to 60% by weight to the total amount of ink.

Organic Solvent

Organic solvents are used to improve ejection stability of ink by imparting moisturizing effect. The content thereof is preferably from 10% by weight to 50% by weight to the total amount of ink. When the content is 10% by weight or more, the ink does not easily evaporate so that evaporation of the moisture of ink in the ink supplying system in an inkjet recording device is reduced, thereby preventing the ink from clogging.

In addition, when the content is 50% by weight or less, the ink viscosity is suppressed to be low even if a large amount of the solid contents such as pigments, resins, etc. are contained, thereby producing images having high image density.

Specific examples of the organic solvents includes the following but are not limited thereto.

Polyols such as ethylene glycol, diethylene glycol, 1,3-butane diol, 3-methyl-1,3-butyl glycol, triethylene glycol, polyethylene glycol, polypropylene glycol, dipropylene glycol, tripropylene glycol, polypropylene glycol, 1,5-pentane diol, 1,6-hexane diol, glycerin, 1,2,6-hexane triol, 2-ethyl-1,3-hexane diol, 2,2,4-trimethyl-1,3-pentan diol, 1,2,4-butane triol, 1,2,3-butane triol, timethlol propane, and petriol; polyol alkyl ethers such as ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether; polyol aryl ethers such as ethylene glycol monophenyl ether and ethylene glycol monobenzyl ether; nitrogen-containing heterocyclic compounds such as 2-pyrrolidone, N-methyl-2-pyrrolidone, N-hydroxyethyl-2-pyrrolidone, 1,3-dimethylimidazolidinone, ε-caprolactam, and γ-butyrolactone; amides such as formamide, N-methylformamide, and N,N-dimethylformamide; amines such as monoethanolamine, diethanolamine, and triethanolamine; sulfur-containing compounds such as dimethyl sulfoxide, sulfolane, and thiodiethanol; propylene carbonate, and ethylene carbonate.

These organic solvents can be used alone or mixed in combination.

Of these, if 1,3-butane diol, diethylene glycol, 2,2,4-trimethyl-1,3-pentanediol, triethylene glycol, and/or glycerin are contained, poor ejection caused by evaporation of moisture can be prevented greatly.

The organic solvent for use in the present disclosure contains a pen leafing agent. Such permeating agent preferably contains at least one kind of polyol compound having 8 to 11 carbon atoms or glycol ether compounds having 8 to 11 carbon atoms.

The permeating agent can be "a medium having non-wetting agent property". These permeating agents having a non-wetting agent property preferably have a solubility of from 0.2% by weight to 50% by weight in water at 25° C. Of these, 2-ethyl-1,3-hexane diol (solubility: 4.2% by weight at 25° C.) and 2,2,4-trimethyl-1,3-pentane diol (solubility: 2.0% by weight at 25° C.) are particularly preferable.

Specific examples of the other polyol compounds include, but are not limited to, aliphatic diols such as 2-ethyl-2-methyl-1,3-propanediol, 3,3-dimethyl-1,2-butane diol, 2,2-diethyl-1,3-propane diol, 2-methyl-2-propyl-1,3-propane diol, 2,4-dimethyl-2,4-pentane diol, 2,5-dimethyl-2,5-hexane diol, and 5-hexene-1,2-diol.

The other permeating agent usable in combination can be any agent capable of being dissolved in an ink and adjusting to desired properties and are suitably selected to particular applications.

Specific example thereof include, but are not limited to, alkyl and aryl ethers of polyols such as diethylene glycol monophenyl ether, ethylene glycol monophenyl ether, ethylene glycol monoaryl ether, diethylene glycol monophenyl ether, diethylene glycol monobutyl ether, propylene glycolo monobutyl ether, and tetraethylene glycol chlorophenyl ether; and lower alcohols such as ethanol.

The content of the permeating agent in ink is preferably from 0.1% to 4% by weight.

When the content thereof is less than 0.1% by weight, the ink is not easily quickly dried so that images with blur are obtained.

When the content is greater than 4.0% by weight, the dispersion stability of the pigment may deteriorates, nozzles tend to clog, and the permeation into the recording medium tends to be excessively high, which leads to a decrease of the image density and the occurrence of strike-through.

Pigment

The content of the pigment for use in the present disclosure in ink is preferably from 0.1% by weight to 20.0% by weight.

The volume average particle diameter (D50) of the pigment is preferably 150 nm or less. The volume average particle diameter (D50) is measured by MicroTrack UPA (manufactured by Nikkiso Co., Ltd.) at 23° C. and 55% RH according to dynamic light scattering method.

There is no specific limit to the selection of the pigment. For examples, inorganic pigments and organic pigments can be suitably selected. These can be used alone or in combination.

Specific examples of the inorganic pigments include, but are not limited to, titanium oxide, iron oxide, calcium oxide, barium sulfate, aluminum hydroxide, barium yellow, ferric hexacyanoferrate, cadmium red, chrome yellow, metal powder, and carbon black.

Of these, carbon black is preferable. Carbon black that is manufactured by, for example, a known method such as a contact method, a furnace method, and a thermal method can be used.

Specific examples of the organic pigments include, but are not limited to, azo pigments, azomethine pigments, polycyclic pigments, dye chleates, nitro pigments, nitroso pigments, and aniline black. Of these, azo pigments and polycyclic pigments are more preferable.

Specific examples of the azo pigments include, but are not limited to, azo lake, insoluble azo pigments, condensation azo pigments, and chleate azo pigments.

Specific examples of the polycyclic pigments include, but are not limited to, phthalocyanine pigments, perylene pigments, perinone pigments, anthraquinone pigments, quinacridone pigments, dioxazine pigments, indigo pigments, thioindigo pigments, isoindolinone pigments, quinofuranone pigments, and, Rhodamine B lake pigments.

Specific examples of the dye chelates include, but are not limited to, bass dye type chelates and acid dye type chleates.

Specific examples of the black pigments include, but are not limited to, carbon black (C.I. Pigment Black 7) such as furnace black, lamp black, acetylene black, and channel black, metals such as copper, iron (C.I. Pigment Black 11), metal oxides such as titanium oxides, and organic pigments such as aniline black (C.I. Pigment Black 1).

It is suitable to use carbon black manufactured by a furnace method or channel method, which has a primary, particle diameter of from 15 nm to 40 nm, a specific surface area of from 50 $m^2/g$ to 300 $m^2/g$ according to BET absorption method, a DPB absorption oil amount of from 40 ml/100 g to 150 ml/100 g, a volatile content of from 0.5% to 10%, and pH of from 2 to 9.

Specific examples of carbon black available on market include, but are not limited to, No. 2300, No. 900, MCF-88, No. 33, No. 40, No. 45, No. 52, MA7, MA8, MA100, No. 2200B (all manufactured by Mitsubishi Chemical Corporation); Raven 700, Raven 5750, Raven 5250, Raven 5000, Raven 3500, and Raven 1255 (all manufactured by Colombia Co., Ltd.), Regal 400R, Regal 330R, Regal 660R, Mogul L, Monarch 700, Monarch 800, Monarch 880, Monarch 900, Monarch 1000, Monarch 1100, Monarch 1300, and Monarch 1400 (all manufactured by Cabot Corporation); and Color Black FW1, Color Black FW2, Color Black FW2V, Color Black FW18, Color Black 200, Color Black S150, Color Black S160, Color Black S170, Printex 35, Printex U, Printex V, Printex 140U, Printex 140V, and Special Black 6, Special Black 5, Special Black 4A, and Special Black 4 (all manufactured by Degussa AG). There is no specific limit to the color pigment for use in yellow ink, which can be selected to a particular application.

Specific examples thereof include, but are not limited to, C.I. Pigment Yellow 1, C.I. Pigment Yellow 2, C.I. Pigment Yellow 3, C.I. Pigment Yellow 12, C.I. Pigment Yellow 13, C.I. Pigment Yellow 14, C.I. Pigment Yellow 16, C.I. Pigment Yellow 17, C.I. Pigment Yellow 73, C.I. Pigment Yellow 74, C.I. Pigment Yellow 75, C.I. Pigment Yellow 83, C.I. Pigment Yellow 93, C.I. Pigment Yellow 95, C.I. Pigment Yellow 97, C.I. Pigment Yellow 98, C.I. Pigment Yellow 114, C.I. Pigment Yellow 120, C.I. Pigment Yellow 128, C.I. Pigment Yellow 129, C.I. Pigment Yellow 138, C.I. Pigment Yellow 150, C.I. Pigment Yellow 151, C.I. Pigment Yellow 154, C.I. Pigment Yellow 155, C.I. Pigment Yellow 174, C.I. Pigment Yellow, and C.I. Pigment Yellow 180.

There is no specific limit to the color pigment for use in magenta ink, which can be selected to a particular application. Specific examples thereof include, but are not limited to, C.I. Pigment Red 5, C.I. Pigment Red 7, C.I. Pigment Red 12, C.I. Pigment Red 48 (Ca), C.I. Pigment Red 48 (Mn), C.I. Pigment Red 57 (Ca), C.I. Pigment Red 57:1, C.I. Pigment Red 112, C.I. Pigment Red 122, C.I. Pigment Red 123, C.I. Pigment Red 146, C.I. Pigment Red 168, C.I. Pigment Red 176, C.I. Pigment Red 184, C.I. Pigment Red 185, C.I. Pigment Red 202, and C.I. Pigment Violet 19.

There is no specific limit to the color pigment for use in cyan ink, which can be selected to a particular application. Specific examples thereof include, but are not limited to, C.I. Pigment Blue 1, C.I. Pigment Blue 2, C.I. Pigment Blue 3, C.I. Pigment Blue 15, C.I. Pigment Blue 15:3, C.I. Pigment Blue 15:4, C.I. Pigment Blue 15:34, C.I. Pigment Blue 16, C.I. Pigment Blue 22, C.I. Pigment Blue 60, C.I. Pigment Blue 63, C.I. Pigment Blue 66, C.I. Pigment Pat Blue 4, and C.I. Pigment Pat Blue 60.

The pigment for use in the present disclosure can be newly manufactured for the present disclosure.

Incidentally, a well-balanced ink having excellent coloring and light fastness can be obtained by Pigment Yellow 74 as yellow pigment, Pigment Red 122 or Pigment Violet 19 as magenta pigment, and Pigment Blue 15:3 as cyan pigment.

Other Components

There is no specific limit to the selection of the other components blended with the ink for the present disclosure. Optionally, dispersants, pH regulators, hydrodispersible resins, preservatives and fungicides, corrosion inhibitors, antioxidants, ultraviolet absorbers, oxygen absorbers, and photostabilizing agents can be blended in the ink of the present disclosure.

pH Regulators

The pH regulator can be any agent capable of adjusting the pH without having an adverse impact on formulated ink and suitably selected to a particular application. Preferred specific examples thereof include, but are not limited to, alcohol amines, hydroxides of alkali metal elements, ammonium hydroxides, phosphonium hydroxides, and alkali metal carbonates. When the pH is less than 7 or greater than 10, the eluted content of an inkjet head and an ink supplying unit tends to increase, which leads to problems such as modification, leakage, and poor discharging of ink. When the pH is less than 7.0, the pH of ink is lowered during storage thereof so that polymer particulates easily agglomerate as the particle size increases.

pH can be measured by, for example, a pH meter (HM-30R, manufactured by DKK-TOA CORPORATION).

Specific examples of the alcohol amines include, but are not limited to, diethanol amine, triethanol amine, and 2-amino-2-ethyl-1,3-propane diol. Specific examples of the alkali metal hydroxides include, but are not limited to, lithium hydroxide, sodium hydroxide, and potassium hydroxide.

Specific examples of the ammonium hydroxides include, but are not limited to, ammonium hydroxide and quaternary ammonium hydroxide. A specific example of the phosphonium hydroxides is quaternary phosphonium hydroxide.

Specific examples of the alkali metal carbonates include, but are not limited to, lithium carbonate, sodium carbonate, and potassium carbonate.

Hydrodispersible Resin

Hydrodispersible resins having excellent film-forming (image forming) property, water repellency, water-resistance, and weather resistance are suitable for image recording of high water-resistance and high image density (high coloring property).

Specific examples thereof include, but are not limited to, condensation-based synthetic resins, addition-based synthetic resins, and natural polymers.

Specific examples of the condensation-based synthesis resins include, but are not limited to, polyester resins, polyurethane resins, polyepoxy resins, polyamide resins, polyether resins, poly(meth)acrylic resins, acrylic-silicone resins, and fluorine-containing resins.

Specific examples of the addition-based synthetic resins include, but are not limited to, polyolefin resins, polystyrene resins, polyvinyl alcohol resins, polyvinyl ester resins, polyacrylic acid resins, and unsaturated carboxylic acid resins. Specific examples of the natural polymers include, but are not limited to, celluloses, rosins, and natural rubber. Of these, polyurethane resin particulates, acrylic-silicone resin particulates, and fluorine-containing resin particulates are preferable.

The volume average particle diameter (D50) of the hydrodispersible resin relates to the viscosity of the liquid dispersion. If the compositions are the same, the viscosity of the same solid portion increases as the particle diameter decreases. To avoid preparing ink having an excessively high viscosity, the volume average particle diameter (D50) of the hydrodispersible resin is preferably 50 nm or greater. In addition, particles having larger particle diameters than the size of the nozzle mouth of the inkjet head, for example, several tens μm, are not usable.

When particles that are smaller than the nozzle mouth but are still large are present in the ink, the ejection stability of the ink deteriorates. The volume average particle diameter (D50) is preferably 200 nm or less not to degrade the ink ejection stability.

The volume average particle diameter (D50) of the hydrodispersible resin is measured by MicroTrack UPA (manufactured by Nikkiso Co., Ltd.) at 23° C. and 55% RH.

In addition, preferably the hydrodispersible resin has a feature of fixing the hydrodispersible pigment on paper and forms a film at room temperature to improve the fixing property of the pigment. Therefore, the minimum film-forming temperature (MFT) of the hydrodispersible resin is preferably 30° C. or lower.

In addition, when the glass transition temperature of the hydrodisdpersible resin is lower than −40° C., the viscosity of the resin film increases, thereby causing the recorded matter to increase tackness. Therefore, the glass transition temperature of the hydrodisdpersible resin is preferably −40° C. or higher.

The content of the hydrodisdpersible resin in the ink for recording is preferably from 1% by weight to 15% by weight and more preferably from 2% by weight to 7% in a solid form.

Preservatives and Fungicides

Specific examples of the preservatives and fungicides include, but are not limited, dehydrosodium acetate, sodium sorbinate, 2-pyridine thiol-1-oxide sodium, sodium benzoate, and pentachlorophenol sodium.

Corrosion Inhibitor

Specific examples of the anti-corrosion agents include, but are not limited to, acid sulfite, thiosodium sulfate, thiodiglycolate ammon, diisopropyl ammonium nitrite, pentaerythritol tetranitrate, and dicyclohexyl ammonium nitrite.

Anti-Oxidant

Specific examples of the anti-oxidants include, but are not limited to, phenol-based anti-oxidants (including hindered phenol-based anti-oxidants), amino-based anti-oxidants, sulfur-based anti-oxidants, and phosphorous-based anti-oxidants.

Ultraviolet Absorber

Specific examples of the ultraviolet absorbers include, but are not limited to, benzophenone-based ultraviolet absorbers, benzotriazole-based ultraviolet absorbers, salicylate-based ultraviolet absorbers, cyanoacrylate-based ultraviolet absorbers, and nickel complex salt-based ultraviolet absorbers.

Manufacturing Method of Ink for Inkjet Recording

The ink for inkjet recording for use in the present disclosure is manufactured by dispersing or dissolving water, an organic solvent, a pigment, and the compound represented by Chemical formula 1, and other optional components in an aqueous medium followed by stirring and mixing, if desired.

This dispersion is conducted by a sand mill, a homogenizer, a ball mill, a paint shaker, an ultrasonic dispersing agent, etc. The stirring and mixing can be conducted by a stirrer having a typical stirring wing, a magnetic stirrer, a high speed dispersing device, etc.

There is no specific limit to the properties of the ink for inkjet recording of the present disclosure. For example, the viscosity, the surface tension, etc., are preferably in the following ranges.

The viscosity of the ink for inkjet recording is preferably from 3 mPa·S to 20 mPa·S at 25° C. When the ink viscosity is 3 mPa·S or greater, the printing density and the printing quality are improved. When the ink viscosity is 20 mPa·S or less, a suitable ink ejection property is secured.

The viscosity can be measured by, for example, a viscometer (RL-550, manufactured by TOM SANGYO CO., LTD.) at 25° C.

The surface tension of the ink for inkjet recording is preferably 40 mN/m or less at 25° C. When the surface tension is greater than 40 mN/m, the leveling of the ink on a recording medium tends to never or little occur, thereby prolonging the drying time.

Ink Container

The ink container of the present disclosure has an ink accommodating unit to accommodate the ink of the present disclosure and other optional suitably-selected members.

There is no specific limit to the container. The container can take any form, any structure, any size, and any material to a particular application. For example, a container having at least an ink accommodating unit formed of aluminum laminate film, a resin film, etc. can be suitably used.

Figure 2:
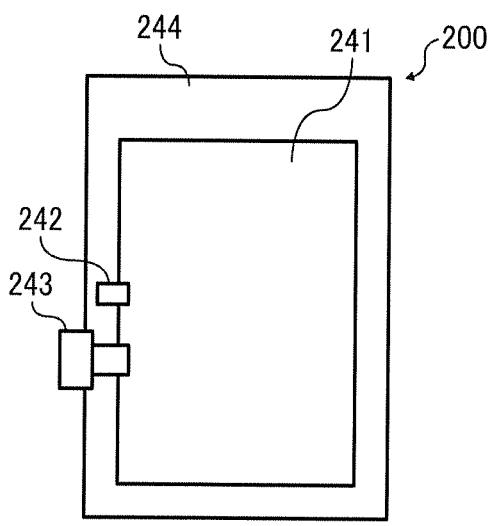
FIG. 2 is a schematic planar view illustrating the ink container illustrated in FIG. 1 including a housing (exterior)

FIGS. 1 and 2 are diagrams illustrating examples of the ink container of the present disclosure. FIG. 1 is a schematic planar view illustrating of an ink container and FIG. 2 is a schematic planar view illustrating an ink container having a housing (exterior).

As illustrated in FIG. 1, in an ink container 200, an ink is supplied to an ink accommodating unit 241 through an ink inlet 242, the air remaining in the ink accommodating unit 241 is discharged, the ink inlet 242 is closed by fusion.

When in use, the ink is supplied by piercing the needle attached to the inkjet recording device into an ink outlet 243 made of rubber.

The ink accommodating unit 241 is formed of a package material such as aluminum laminate film having no air permeability.

As illustrated in FIG. 2, the ink accommodating unit 241 is housed in a cartridge housing 244 typically made of plastic and detachably attachable to a variety of inkjet recording devices.

Inkjet Recording Device

The inkjet recording device of the present disclosure includes the ink container and records information or images on recording media with the ink of the present disclosure by using inkjet heads.

The inkjet recording device includes at least an ink ejection device to eject an ink and other suitably selected optional devices such as a stimulus generating device and a control device.

The ink ejection device ejects the ink of the present disclosure to form images by applying a stimulus thereto. There is no specific limit to the ink ejection device. For example, nozzles for ejecting ink can be suitably used.

The stimulus is generated by, for example, a stimulus generating device. There is no specific limit to the selection of the stimuli. Heat (temperature), pressure, vibration, and light can be suitably used. These may be used alone or in combination of two or more thereof. Of these, heat and pressure are preferable. Examples of the device to generate such a stimulus include a heater, a pressurization device, a piezoelectric element, a vibrator, an ultrasonic oscillator, light, etc.

Specific examples thereof include, but are not limited to, a piezoelectric actuator of piezoelectric elements, etc., a thermal actuator that utilizes a phase change caused by film boiling of liquid using an electric heat conversion element such as a heat element, a shape-memory alloy actuator that uses the metal phase change due to temperature change, and an electrostatic actuator that uses an electrostatic force.

How the ink is ejected has no specific limit and can be determined depending on the kind of stimuli mentioned above.

For example, in a case in which "heat" is applied as a stimulus, a method can be used which includes applying thermal energy according to recording signals to ink in a recording head by, for example, a thermal head to generate air bubbles in the ink, thereby ejecting and spraying the ink as droplets from the nozzles of the recording head due to the pressure of the air bubbles.

In addition, in a case in which the stimulus is "pressure", for example, a method can be used in which ink is ejected and sprayed from the nozzle holes of a recording head as droplets by applying a voltage to a piezoelectric element attached to the position of a pressure room located in the ink flow path in the recording head, thereby bending the piezoelectric element, resulting in a decrease in the volume of the pressure room.

There is no specific limit to a controlling device that is be able to control the behavior of each device and any controlling device can be suitably selected. For example, devices such as a sequencer and a computer can be used.

The inkjet recording devices according to embodiments of the present disclosure, which were used in Examples, are described below.

Figure 3:
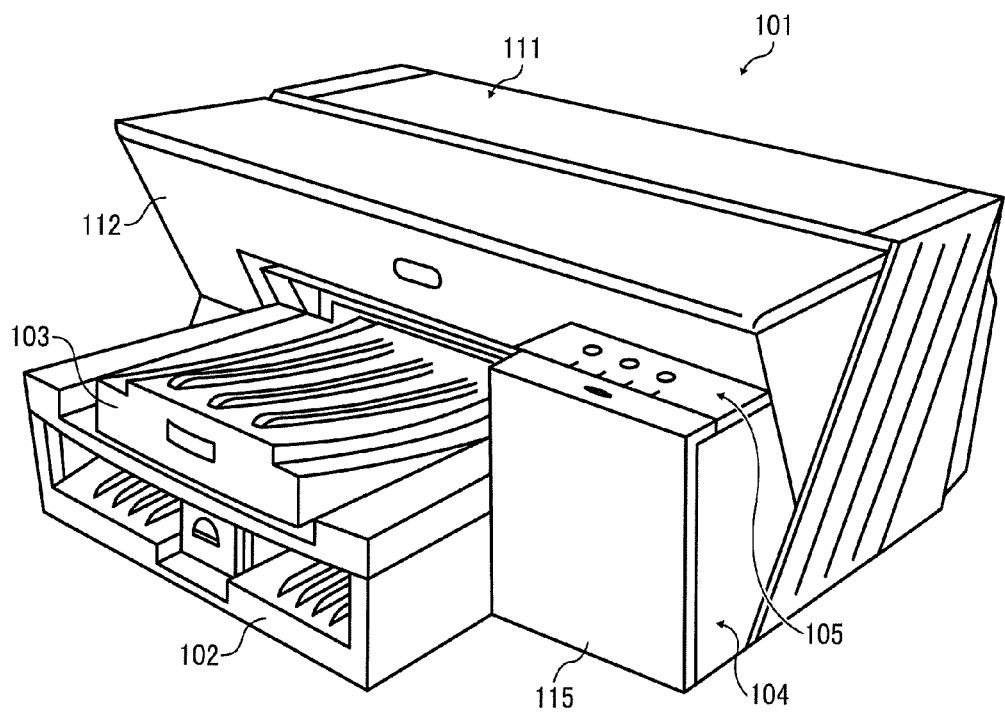
FIG. 3 is a perspective view illustrating an example of a serial type inkjet recording device according to an embodiment of the present invention.

FIG. 3 is a perspective view illustrating an example of the serial type inkjet recording device according to an embodiment of the present disclosure. An inkjet recording device 101 has a sheet feeder tray 102 to accommodate recording media placed therein, a paper ejection tray 103 installed in the inkjet recording device 101, which stores recording media on which images are recorded (formed), and an ink cartridge inserting unit 104, which situates at a lower level than an upper cover 111 and protrudes from an front face 112 on one edge surface of the front face 112. On the upper surface of the ink container inserting unit 104 is arranged an operating portion 105 including operation keys, a display, etc. The ink container inserting unit 104 has a front cover 115 that is openable and closable to detach and attach an ink container 200.

Figure 4:
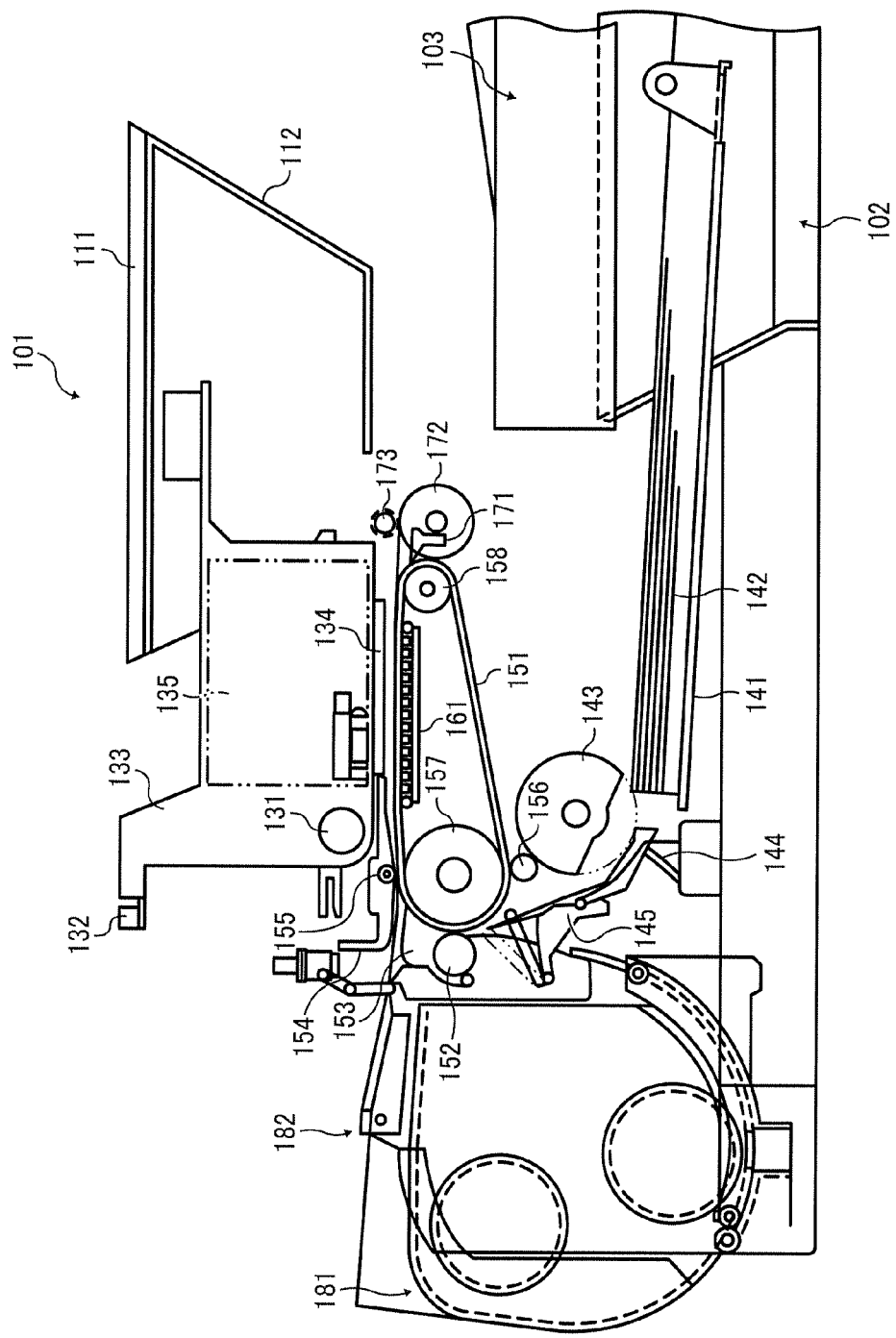
FIG. 4 is a partially enlarged cross section illustrating the inkjet recording device illustrated in FIG. 3.
Figure 5:
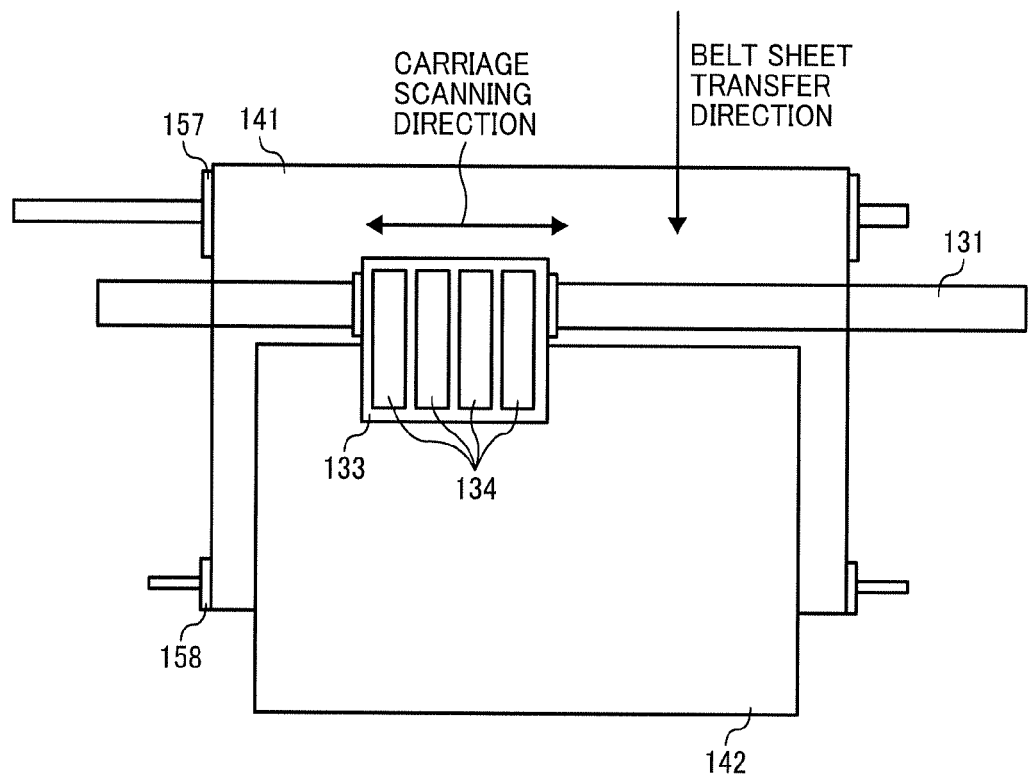
FIG. 5 is another partially enlarged cross section illustrating the inkjet recording device illustrated in FIG. 3.

Inside the inkjet recording device 101, as illustrated in FIGS. 4 and 5 (a partially enlarged cross section of the recording device illustrated in FIG. 3), a stay 132 and a guide rod 131 serving as guiding members that bridge laterally side plates on the right hand side and left hand side hold a carriage 133 slidably in the main scanning direction. A main scanning motor moves the carriage 133 in the direction indicated by the arrow in FIG. 5.

The carriage 133 has a recording head 134 having four inkjet recording heads that discharge ink droplets of each color of yellow (Y), cyan (C), magenta (M), and black (Bk) while multiple ink discharging mouths are arranged in the direction crossing the main scanning direction with the ink droplet discharging direction downward.

As the heads for inkjet recording that form the recording head 134, it is possible to use a device having an energy-generating device to discharge ink such as a piezoelectric actuator such as a piezoelectric element, a thermal actuator that utilizes the phase change caused by film boiling of liquid using an electric heat conversion element such as a heat element, a shape-memory alloy actuator that uses the metal phase change due to the temperature change, and an electrostatic actuator that uses an electrostatic force.

The carriage 133 has sub tanks 135 for colors to supply each color ink to the recording head 134. The ink is supplied and replenished to the sub-tank 135 from the ink container 200 of the present disclosure mounted onto the ink cartridge inserting unit 104 via an ink supplying tube.

A sheet feeding unit to feed a sheet 142 loaded on a sheet loader (pressure plate) 141 of the sheet feeder tray 102 includes a half-moon shape roller (sheet feeding roller 143) to separate and feed the sheet 142 one by one from the sheet loader 141 and a separation pad 144 that is made of a material having a large friction index and arranged facing the sheet feeding roller 143 while biased towards the sheet feeding roller 143.

A transfer unit to transfer the sheet 142 fed from the sheet feeding unit below the recording head 134 includes a transfer belt 151 to transfer the sheet 142 by electrostatic adsorption, a counter roller 152 to transfer the sheet 142 fed from the sheet feeding unit via a guide 145 by pinching the sheet 142 with a transfer belt 151, a transfer guide 153 to make the sheet 142 follow the transfer belt 151 by changing the transfer direction of the sheet 142 being sent substantially vertically upward substantially 90°, and a front end pressure roller 155 biased to the transfer belt 151 by a pressing member 154.

In addition, a charging roller 156 serving as a charger is provided to charge the surface of the transfer belt 151.

The transfer belt 151 is an endless form belt, suspended between a transfer roller 157 and a tension roller 158 and rotatable in the belt transfer direction.

This transfer belt 151 includes, for example, a top layer serving as a sheet adsorption surface made of a resin material such as a copolymer (ETFE) of tetrafluoroethylene and ethylene with no resistance control treatment having a thickness about 40 μm, and a bottom layer (moderate resistance layer, earth layer) made of the same material as the top layer with resistance control treatment with carbon.

On the rear side of the transfer belt 151, a guiding member 161 is arranged corresponding to the printing area by the recording head 134.

A discharging unit to discharge the sheet 142 on which images are recorded by the recording head 134 includes a separation claw 171 to separate the sheet 142 from the transfer belt 151, a discharging roller 172, and a discharging roller 173. A paper ejection tray 103 is arranged below the discharging roller 173.

A duplex printing sheet feeding unit 181 is attached detachably and attachably to the rear side of the inkjet recording device 101.

The duplex printing sheet feeding unit 181 takes in and reverses the sheet 142 that is returned by the reverse rotation of the transfer belt 151 and feeds it again between the counter roller 152 and the transfer belt 151.

A bypass sheet feeding unit 182 is provided on the upper surface of the duplex printing sheet feeding unit 181

In this inkjet recording device, the sheet 142 is separated and fed from the sheet feeding unit one by one substantially vertically upward, guided by the guide 145, and transferred while being pinched between the transfer belt 151 and the counter roller 152.

Furthermore, the front end is guided by the transfer guide 153 and pressed against the transfer belt 151 by the front end pressure roller 155 to change the transfer direction substantially 90°. Since the transfer belt 151 is charged by the charging roller 156 at this point in time, the sheet 142 is electrostatically adsorbed to the transfer belt 151 and transferred. By driving the recording head 134 in response to the image signal while moving the carriage 133, the ink droplet is discharged to the sheet 142 not in motion to record an image in an amount of one line and thereafter the sheet 142 is transferred in a predetermined amount to be ready for the recording for the next line.

On receiving a signal indicating that the recording has completed or the rear end of the sheet 142 has reached the image recording area, the recording operation stops and the sheet 142 is discharged to the paper ejection tray 103. When the amount of ink remaining in the sub-tank 135 is detected to be approaching to empty, a predetermined amount of the ink is replenished to the sub tank 135 from the ink container 200.

In this inkjet recording device, it is possible to dissemble the chassis of the ink container 200 and replace the ink accommodating unit therein when the ink is used up in the ink container 200. In addition, the ink container 200 stably supplies the ink even when the ink container 200 is placed on its side and installed by front loading.

Therefore, even when the upside of the inkjet recording device 101 is blocked, for example, it is placed in a rack or something is placed on the upper surface of the inkjet recording device 101, the ink container 200 is easily exchanged.

A serial type (shuttle type) in which the carriage scans is used in this description but this is true in a line-type inkjet recording device having a line type head.

The inkjet recording device of the present disclosure can be applied to recording systems employing inkjet recording system such as printers, facsimile machines, photocopiers, printer/photocopier multifunction peripherals for inkjet recording in particular.

Recorded Matter and Manufacturing Method of Recorded Matter

On the recorded matter of the present disclosure, information or an image is recorded on a recording medium by using the ink of the present disclosure. The recorded matter of the present disclosure can be manufactured by a process of discharging an ink from an inkjet head to record on a recording medium.

There is no specific limit to the selection of the recording medium, which can be selected to a particular application. For examples, plain paper, coated paper for printing, gloss paper, special paper, cloth, film, and transparent sheets can be used.

These may be used alone or in combination of two or more thereof. Of these, plain paper or coted paper for printing is preferable. It is particularly preferable that the ink of the present disclosure is used for paper having an eluted amount of calcium ion of from $1.0 \times 10^{-4}$ to $5.0 \times 10^{-4}$ (g/g). Plain paper is advantageous because it is inexpensive. Moreover, coated paper for printing is relatively inexpensive to gloss paper and advantageous in that smooth images with gloss are printed. However, plain paper and coated paper for printing are not dried well. For this reason, in general, they are not practically suitable for inkjet printing. However, according to the ink of the present disclosure, drying property is improved so that such recording media can be suitably used.

The recorded matter of the present disclosure is of high quality blur-free image and excellent in stability over time so that it can be suitably used for various purposes such as references, on which texts, images, etc. are recorded.

Having generally described preferred embodiments of this invention, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Next, the present disclosure is described in detail with reference to Examples and Comparative Examples but not limited thereto.

The weight average molecular weight and viscosity of the resins in Examples were measured as follows.

Weight Average Molecular Weight of Resin

The weight average molecular weight of a resin was measured by the following method. The weight average molecular weight was measured according to GPC method using a column constant temperature tank (CTO-20A, manufactured by Shimadzu Corporation), a detector (RID-10A, manufactured by SHIMADZU CORPORATION), an eluent flowing path pump (LC-20AD, manufactured by SHIMADZU Corporation), a deflating equipment (Degasser DGU-20A, manufactured by SHIMADZU CORPORATION), and an autosampler (SIL-20A, manufactured by SHIMADZU CORPORATION). The column used was formed by connecting an aqueous SEC column TSKgel G3000 PWXL (elimination limit molecule quantity: $2 \times 10^5$), TSKgel G5000 PWXL (elimination limit molecule quantity: $2.5 \times 10^5$), and TSKgel G6000 PWXL (elimination limit molecule quantity: $5 \times 10^5$) (all manufactured by TOSOH CORPORATION). A sample was adjusted to be 2 g/100 ml by an eluent and used for measurement. An aqueous solution adjusted to have 0.5 mol/L of each of acetic acid and sodium acetate were used as the eluent. The column temperature was 40° C. and the flowing speed is 1.0 m/L.

Viscosity of Resin

With regard to the synthesized resin, the viscosity of 10% by weight aqueous solution thereof was measured at 25° C. by using a rotation viscometer (Viscometer RE550L, Cone plate type, manufactured by TOM SANGYO CO., LTD.). To be specific, 1.1 mL of the resin was taken and placed in a sample cup of the viscometer. This was mounted to the viscometer and thereafter stood still for one minute. Thereafter, the rotor of the viscometer was rotated to read the value one minute later. The number of rotation at the time of viscosity measuring was controlled to be constant in the torque range of from 40% to 80%.

Preparation of Neutralized Aqueous Solution of EDDS, Neutralized Aqueous Solution of EDTA, and Neutralized Aqueous Solution of NTA In the present disclosure, EDDS or other chelating agent can be added after part or the entire of carboxylic acid groups or other hydrophilic groups are neutralized.

Incidentally, the neutralization ratio in the present disclosure is the value obtained by the following method, which is different from the ratio of the proton in EDDS or the other chelators actually substituted with metal ions and organic ammonium ions.

As for the compound represented by Chemical formula 1, the compound prior to neutralization is defined as Compound H, Neutralization ratio X (%)=(mol number of base added×valent number of cation of base)/(mol number of Compound H×Number of hydrophilic groups in Compound H)×100.

Mol number of base added=Addition amount Y (g) of base/molecular weight of base Mol number of compound=Charged amount Z (g) of Compound H/Molecular weight of Compound H Therefore, the amount of base to obtain a neutralization ratio X (%) is calculated by the following relation.

The addition amount Y (g) of base=Neutralization ratio X (%)×(Charged amount Z (g) of Compound H×4)×molecular weight of base/(valent number of cation of base×100×Molecular weight of Compound H).

Preparation Example 1 of Aqueous Solution
Tetraethyl Ammonium Hydroxide (TEAH) Neutralized 20% by Weight Aqueous Solution of EDDS {(S,S)-Ethylene Diamine Disuccinic Acid}

Tetraethyl ammonium hydroxide (TEAH) neutralized 20% by weight aqueous solution of EDDS was prepared by mixing the following recipe. The neutralization ratio was set to be 75%.

| | |
|---|---|
| Powder of (S,S)-ethylene diamine disuccinic acid trihydrate: (Solid portion 100% by weight, CHELEST EDDS-4H, manufactured by CHELEST CORPORATION): | 10 parts |
| 35% by weight aqueous solution of tetraethyl ammonium hydroxide (TEAH): | 37 parts. |
| Distilled water | 53 parts |

Preparation Example 2 of Aqueous Solution

TEAH Neutralized 95% by Weight Aqueous Solution of EDDS

While stirring the thus-prepared TEAH neutralized 20% by weight aqueous solution of EDDS by a stirrer, it was heated at 100° C. to evaporate only water to obtain TEAH neutralized 95% by weight aqueous solution of EDDS having a solid portion of 95% by weight. The neutralization ratio was set to be 75%.

Preparation Example 3 of Aqueous Solution

NaOH Neutralized 20% by Weight Aqueous Solution of EDDS

NaOH neutralized 20% by weight aqueous solution of EDDS was prepared by mixing the following recipe. The neutralization ratio was set to be 75%.

| | |
|---|---|
| Powder of (S,S)-ethylene diamine disuccinic acid•trihydrate: (Solid portion 100% by weight, CHELEST EDDS-4H, manufactured by CHELEST CORPORATION): | 19 parts |
| 40% by weight aqueous solution of sodium hydroxide: | 17 parts |
| Distilled water | 64 parts |

Preparation Example 4 of Aqueous Solution

TEAH Neutralized 20% by Weight Aqueous Solution of EDTA

Tetraethyl ammonium hydroxide (TEAH) neutralized 20% by weight aqueous solution of ethylenediamine tetra acetic acid (EDTA) was prepared by mixing the following recipe. The neutralization ratio was set to be 75%.

| | |
|---|---|
| Powder of ethylenediamine tetra acetic acid (Solid portion 100% by weight, special grade, manufactured by Kokusan Chemical Co., Ltd.) | 9 parts |
| 35% by weight aqueous solution of tetraethyl ammonium hydroxide (manufactured by Tokyo Chemical Industry Co., Ltd.): | 37 parts |
| Distilled water | 54 parts |

Preparation Example 5 of Aqueous Solution

Preparation of TEAH Neutralized 20% by Weight Aqueous Solution of Nitrilotriacetic Acid (NTA)

Tetraethyl ammonium hydroxide (TEAH) neutralized 20% by weight aqueous solution of nitrilotriacetic acid (NTA) was prepared by mixing the following recipe. The neutralization ratio was set to be 67%.

| | |
|---|---|
| Nitrilotriacetic acid (Solid portion 100% by weight, CHELEST 2NT, manufactured by CHELEST CORPORATION): | 9 parts |
| 35% by weight aqueous solution of tetraethyl ammonium hydroxide (manufactured by Tokyo Chemical Industry Co., Ltd.): | 37 parts |
| Distilled water | 54 parts |

Synthesis Example of Resin Dispersant Having Hydrophilic Group

Synthetic Example 1 Resin Dispersant Having Bisphosphonic Acid Group Synthesis Method of Two-Element System Dispersant Using Bisphosphoric Acid Monomer and Hydrophobic Group Monomer 500.0 parts of a solvent (ethanol), 40.0 parts by weight of the compound represented by Chemical structure 2 illustrated below (synthesized by the method disclosed in JP-S58-222095-A), 60.0 parts of the compound (1-vinyl naphthalene, manufactured by Tokyo Chemical Industry Co., Ltd.) represented by Chemical structure 3 illustrated below, and 4.0 parts of a polymerization initiator (2,2'-azobisisobutylonitrile, manufactured by Tokyo Chemical Industry Co., Ltd.) were charged in a flask equipped with a stirrer, a thermometer, and a nitrogen introducing tube. Subsequent to polymerization reaction in a nitrogen atmosphere for ten hours, about a half of the charged solvent was distilled away from the reaction system. Thereafter, a polymer was obtained by infusing the mixture in acetone to precipitate the polymer followed by drying.

While diluting the thus-obtained polymer with water, potassium hydroxide was added to achieve 100% acid neutralization. Thereafter, the concentration of the resultant was adjusted with water in such a manner that the concentration of the solid portion was 10% by weight.

As a result, Polymer 1 was synthesized, in which the phosphonic acid group was 100% neutralized. The Polymer 1 had a weight average molecular weight of 5,000. The viscosity of 10% by weight aqueous solution of the obtained resin at 25° C. was 3.3 mPa·s.

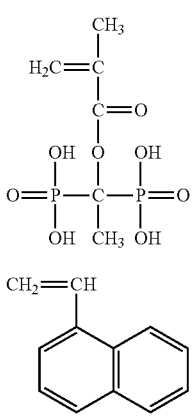

Chemical structure 2

Synthetic Example 2 Resin Dispersant Having Phosphoric Acid Group

Synthesis Method of Two-Element System Dispersant Using Phosmer M and Hydrophobic Group Monomer 500 parts of a solvent 1-methoxy-2-propanol, 30 parts of phosmer M represented by Chemical structure 4 illustrated below (manufactured by Uni-Chemical Co., Ltd.), 10 parts of diacetone acrylamide (manufactured by Nihon Kasei CO., LTD.), 60 parts of 1-vinyl naphthalene (manufactured by Tokyo Chemical Industry Co., Ltd.), and 4 parts of a polymerization initiator (azobis isobutylonitrile) were charged in a flask equipped with a stirrer, a thermometer, and a nitrogen-introducing tube followed by heating to 65° C. for polymerization in nitrogen atmosphere for 15 hours. Thereafter, after distilling away about a half of the solvent, the resultant was charged into a large quantity of methanol to precipitate Resin 2. Furthermore, the precipitated Resin 2 having an acid group was dried. The resin 2 having an acid group had a weight average molecular weight of 30,000. While diluting the thus-obtained polymer with water, potassium hydroxide was added to achieve 100% acid neutralization. Thereafter, the concentration of the resultant was adjusted with water in such a manner that the concentration of the solid portion was 10% by weight. As a result, the Resin 2 was synthesized, in which the phosphoric acid group was 100% neutralized. The viscosity of 10% by weight aqueous solution of the obtained resin at 25° C. was 2.8 mPa·s.

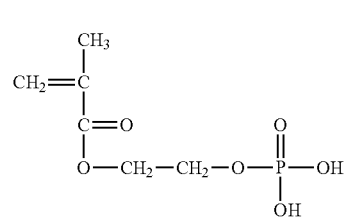

Chemical structure 4

Preparation Examples of Pigment Dispersion Element

Each of pigment dispersion element was prepared as follows.

1. Pigment Dispersion Element Dispersed by Dispersant 1-1. Pigment Dispersion Element (Bk) of Dispersant Having Bisphosphonic Acid Group Type The following recipe was pre-mixed to prepare a mixed slurry. The mixed slurry was dispersed in a circulating manner for three minutes by a disc type media mill (DMR type, manufactured by Ashizawa Finetech Ltd.) using 0.05 mm zirconia beads with a filling ratio of 55% at a peripheral speed of 10 m/s at a liquid temperature of 10° C. Thereafter, coarse particles were separated by a centrifugal (Model-7700, manufactured by KUBOTA Corporation) to obtain a pigment dispersion medium 1-1 having a pigment concentration of 16%.

| | |
|---|---|
| Carbon black (NIPEX160, manufactured by Evonik Degusa Japan, Co., Ltd. BET specific surface area: 150 m$^2$/g, average primary particle diameter: 20 nm, pH: 4.0, DBP oil absorption: 620 g/100 g): | 160 parts |
| Resin 1: | 400 parts |
| Distilled water | 440 parts |

1-2. Pigment Dispersion Element (Cyan) of Dispersant Having Bisphosphonic Acid Group Type A pigment dispersion element 1-2 having a pigment concentration of 16% was obtained in the same manner as in 1-1 except that carbon black of 101 was changed to Pigment Blue 15:3 (Chromofine Blue, manufactured by Dainichiseika Color & Chemicals Mfg. Co., Ltd.).

1-3. Pigment Dispersion Element (Magenta) of Dispersant Having Bisphosphonic Acid Group Type A pigment dispersion element 1-3 having a pigment concentration of 16% was obtained in the same manner as in 1-1 except that carbon black of 101 was changed to Pigment Red 122 (Toner Magenta E002, manufactured by Clariant).

1-4. Pigment Dispersion Element (Yellow) of Dispersant Having Bisphosphonic Acid Group Type A pigment dispersion element 1-4 having a pigment concentration of 16% was obtained in the same manner as in 1-1 except that carbon black of 101 was changed to Pigment Yellow 74 (FAST YELLOW 531, manufactured by Dainichiseika Color & Chemicals Mfg. Co., Ltd.).

1-5. Pigment Dispersion Element of Dispersant Having Phosphoric Acid Group Type

A pigment dispersion element 1-5 having a pigment concentration of 16% was obtained in the same manner as in 1-1 except that Resin 1 of 1-1 was changed to Resin 2.

1-6. Pigment Dispersion Element of Dispersant Having Polyoxyethylene Group Type

A pigment dispersion element 1-6 having a pigment concentration of 16% was obtained in the same manner as in 1-1 except that Resin 1 of 1-1 was changed to polyoxyethylene (POE) (m=40)-β-naphtyl ether (manufactured by TAKEMOTO OIL & FAT CO., LTD.).

The compositions of each pigment dispersion element obtained in Preparation Examples 1-1 to 1-6 of Pigment Dispersion Element are shown in Table 1. The values in Table are represented in parts by weight.

TABLE 1

| | Pigment dispersion element | | | | | |
|---|---|---|---|---|---|---|
| | 1-1 | 1-2 | 1-3 | 1-4 | 1-5 | 1-6 |
| Resin 1 10% by weight aqueous solution of | 400 | 400 | 400 | 400 | | |
| Resin 2 10% by weight aqueous solution of | | | | | 400 | |
| 10% by weight aqueous solution of PDE (m = 40) β-naphthyl ether | | | | | | 400 |
| Carbon black | 160 | | | | 160 | 160 |
| Pigment Blue 15:3 | | 160 | | | | |
| Pigment Red 122 | | | 160 | | | |
| Pigment Yellow 74 | | | | 160 | | |
| Distilled water | Rest | Rest | Rest | Rest | Rest | Rest |
| Total | 1000 | 1000 | 1000 | 1000 | 1000 | 1000 |

2. Pigment Dispersion Element of Resin Coating Type 2-1. Pigment Dispersion Element of Resin Having Amide Group and Polyoxyethylene Group Coating Type As preparation of a polymer solution, after replacement with nitrogen gas in a flask equipped with a mechanical stirrer, a thermometer, a nitrogen gas introducing tube, a reflux tube, and a dripping funnel, 11.2 g of styrene, 2.8 g of acrylic acid, 12.0 g of lauryl methacrylate, 4.0 g of polyethylene glycol methacrylate, 4.0 g of styrene macromer (AS-6, manufactured by TOA GOSEI CO., LTD.), and 0.4 g of mercapto ethanol were charged in the flask followed by heating to 65° C.

Next, a liquid mixture of 100.8 g of styrene, 25.2 g of acrylic acid, 108.0 g of lauryl methacrylate, 36.0 g of polyethylene glycol methacrylate, 60.0 g of hydroxyethyl methacrylate, 36.0 g of styrene macromer, 3.6 g of mercapto ethanol, 2.4 g of azobisdimethyl valeronitrile, and 18 g of methylethyl ketone was dripped to the flask in two and a half hours.

Subsequently, a liquid mixture of 0.8 g of azobis methyl valeronitrile and 18 g of methylethyl ketone was dripped to the flask in half an hour. After one-hour aging at 65° C., 0.8 g of azobismethyl valeronitrile was added followed by further one-hour aging. After the reaction was complete, 364 g of methylethyl ketone was added to the flask to obtain 800 g of polymer solution having a concentration of 50% by weight. Next, part of the polymer solution was dried and the weight average molecular weight thereof was measured, which was 15,000.

28 g of the polymer solution, 26 g of carbon black, 13.6 g of 1 mol/l potassium hydroxide solution, 20 g of methylethyl ketone, and 30 g of deionized water were sufficiently stirred.

Thereafter, the resultant was mixed and kneaded 20 times by a three-roll mill (Product name: NR-84A, manufactured by NORITAKE CO., LIMITED). The thus-obtained paste was charged in 200 g of deionized water. Subsequent to sufficient stirring, methylethyl ketone and part of water were distilled away by an evaporator to obtain Pigment Dispersion Element 2-1 of resin coating type having a pigment concentration of 16% by weight.

2-2. Pigment Dispersion Element of Resin Having Phosphonic Acid Group Coating Type A pigment dispersion element 2-2 of resin coating type having a pigment concentration of 16% was obtained in the same manner as in 2-1 except that 2.8 g of acrylic acid was changed to 2.8 g of vinyl phosphonic acid.

3. Dispersion Element of Self-Dispersion Type 3-1. Pigment Dispersion Element of Self Dispersion Type Having Phosphoric Acid Group Synthesis of Resin A copolymer was prepared by using a semi-continuous supplying method. The Phosmer M (manufactured by Uni-Chemical Co., Ltd.) represented by Chemical structure 4 was stirred with acidic Amberlite resin washed with DMSO to remove impurities for 14 hours to be dissolved in DMSO (7% solid portion). Butyl acrylate and nitrophenyl acrylamide were dissolved in this solution with a mass ratio of the monomers of 28.7% by weight of phosmer M, 68.3% by weight of butyl acrylate, and 3% by weight of nitrophenyl acrylamide. A flask equipped with a heating mantle controlled by thermocouple thermostat, a dripping funnel, and frosted glass joint with a barrier membrane cap on was filled with one tenth of the total amount of the DMSO solution of the monomer. The rest (=nine tenths) of the DMSO solution of the monomer was placed in the dripping funnel. A hypodermic syringe was filled with DMSO solution of 10% by weight 4,4'-azobis cyano valeric acid (ACVA) containing ACVA accounting for 3% by weight to the total amount of the monomer contained in the total amount of the initially prepared DMSO solution of the monomer. The reaction mixture was heated to 105° C. and one tenth of the 10 by weight ACVA solution was added to the reaction mixture. The DMSO solution of the monomer in the dripping funnel and the rest (nine tenths) of the 10% by weight ACVA solution were added every half an hour for five hours. Thereafter, the temperature was maintained at 105° C. for one hour followed by cooling down. The thus-obtained resin (containing repeating units having phosphoric acid group) was precipitated in 5% by weight acetic acid water and the precipitation was extracted. The solid portion was washed with distilled water twice. The viscosity of 10% by weight aqueous solution of the obtained resin was 1.9 mPa·s. The resin was purged in tetrahydrofuran solution (10% solid portion) by nitrogen to be hydrogenated. 2.5 g of 10% supported palladium activated carbon was added to the solution to hydrogenate the mixture at 45 psi for 3 to 4 hours by Parr device. The thus-obtained resin was used as was for preparation for reformed pigments.

Reformed Pigment 20 g of BLACK PEARLS™ 700 carbon black was added to a 500 ml stainless steel beaker. 20 g of the resin was dissolved in 132 g of THF and the thus-obtained solution was added to the carbon black in the stainless steel beaker together with 48 g of THF and 20 g of water. The mixture was stirred with a propeller blade and a rotor stator and heated to 55° C. 0.25 g of sodium nitrite was dissolved in 16 g of water in another container. 0.35 g of methanesulfonic acid was added to the stirred mixture and the sodium nitrite solution was dripped thereto in five minutes. The mixture was maintained by stirring for two hours at 55° C. Next, the resultant mixture was added to and stirred in a polyethylene container having 800 mL of THF by a hand method. The thus-obtained solid portion was collected by centrifugal followed by washing with THF twice. The solid portion was dispersed in 500 mL of water having a pH of 9 for 30 minutes by using a sonic probe. The thus-produced dispersion material was filtered with a sieve having an opening size of 20 micron and diafiltrated by the amount (10 times: about 5 litter) of water for size classification. Thus, a self-dispersion pigment dispersion element 3-1 having a phosphoric acid group as hydrophilic group with a pigment concentration of 16% was obtained.

3-2. Pigment Dispersion Element of Self Dispersion Type Having Carboxyl Acid Group Pigment dispersion element of self dispersion type having a carboxyl group with a pigment concentration of 16% available on market (KM-9036, manufactured by Toyo Ink Mfg. Co., Ltd.) (Black pigment dispersion element) was used as Pigment dispersion element 3-2.

3-3. Pigment Dispersion Element of Self Dispersion Type Having Bisphosphonic Acid Group A pigment dispersion element of self dispersion type was manufactured in the same manner as in—Method A—of Pigment surface reforming treatment disclosed in JP-2012-207202-A.

20 g of carbon black (used in 1-1), 20 mmol of the compound represented by Chemical structure 5 illustrated below, and 200 mL of deionized highly pure water were mixed at room temperature by a Silverson Mixer (6,000 rpm). When an obtained slurry had a pH of 4 or higher, 20 mmol of nitric acid was added. 30 minutes later, 20 mmol of sodium nitrite dissolved in a minute amount of deionized highly pure water was slowly added to the mixture. Furthermore, the temperature was raised to 60° C. while being stirred to conduct reaction for one hour. A reformed pigment can be produced in which the compound represented by Chemical structure 5 illustrated below is added to the carbon black. Thereafter, by adjusting the pH to be 10 by NaOH aqueous solution, a dispersion element of reformed pigment was obtained 30 minutes later. A dispersion element containing a pigment bonded with at least one geminal-bisphosphonic acid group or a sodium salt of geminal bisphosphonic acid and deionized highly pure water were subject to ultrafiltration using a dialysis membrane followed by ultrasonic wave dispersion to obtain Pigment dispersion element 3-3 of self dispersion type having a bisphosphonic acid group as a hydrophilic group with a pigment concentration of 16%.

Chemical structure 5

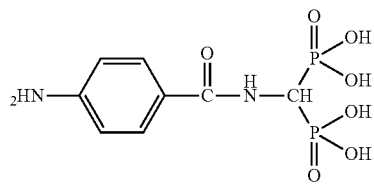

3-4 Pigment Dispersion Element of Polymer Graft Type Having Benzene Tricarboxylic Acid Group A pigment dispersion element was manufactured in the same manner as disclosed in [Example 2] of JP-5001291-B1 (JP-2009-513802-A).

Synthesis of Benzene Tricarboxylic Acid Group Monomer

A 2 litter flask equipped with a magnetic stirrer, a thermometer, and 250 ml dripping funnel were filled with 1 litter of water and 71 g of sodium hydroxide pellet. When this was dissolved, 100 g of 1-aminobenzene-3,4,5-tricarboxylic acid was added and dissolved. After neutralization heat ceased, the reaction result was cooled down to 10° C. The dripping funnel was filled with 40.23 g of methacryloyl chloride. While this was maintained below 15° C., the liquid was dripped to the reaction container in 15 minutes. 40 g of sodium hydroxide was dissolved in 150 g of water in another container. This solution was added to the reaction mixture 20 minutes after the addition of methacryloyl chloride was complete. After the reaction product was cooled down to 10° C., 40 g of methacryloyl chloride was dripped from the dripping funnel in 15 minutes while the temperature was maintained below 15° C. 20 minutes after the dripping was complete, the reaction mixture was acidized to pH 3 by strong chloric acid. The thus-produced solid portion was extracted by vacuum filtration followed by washing with ethanol and dried at 60° C. for 14 hours in a vacuum oven.

Synthesis of Resin

A copolymer was prepared by using a semi-continuous supplying method. The monomer of acrylamide-benzene tricarboxylic acid was stirred with acidic Amberlite resin washed with DMSO to remove impurities for 14 hours to be dissolved in DMSO (7% solid portion). Butyl acrylate and nitrophenyl acryl amide were dissolved in this solution with a mass ratio of the monomers of 28.7% by weight of monomer of acrylamide-benzene tricarboxylic acid, 68.3% by weight of butyl acrylate, and 3% by weight of nitrophenyl acrylamide. A small quantity (3% by weight based of the total monomer supply amount) of mesitylene was added to obtain internal reference material of NMR analysis. A flask equipped with a heating mantle controlled by thermocouple thermostat, a dripping funnel, and frosted glass joint with a barrier membrane cap on was filled with one tenth of the total amount of the DMSO solution of the monomer. The rest (=nine tenths) of the DMSO solution of the monomer was placed in the dripping funnel. A hypodermic syringe was filled with DMSO solution of 10% by weight 4,4'-azobis cyano valeric acid (ACVA) containing ACVA accounting for 3% by weight to the total amount of the monomer contained in the total amount of the initially prepared DMSO solution of the monomer. The reaction mixture was heated to 105° C. and one tenth of the 10 by weight ACVA solution was added to the reaction mixture. The DMSO solution of the monomer in the dripping funnel and the rest (nine tenths) of the 10% by weight ACVA solution were added every half an hour for five hours. Thereafter, the temperature was maintained at 105° C. for one hour followed by cooling down. The thus-obtained polymer (containing repeating units having benzene tricarboxylic acid group) was precipitated in 5% by weight acetic acid and the precipitation was extracted. The solid portion was washed with distilled water twice. The resin had an inherent viscosity of 0.066 dL/g in THF and an acid of 131 mg/KOH. The resin was purged in tetrahydrofuran solution (10% solid portion) by nitrogen to be hydrogenerated. 2.5 g of 10% supported palladium activated carbon was added to the solution to hydrogenerate the mixture at 45 psi for 3 to 4 hours by Parr device. The thus-obtained resin was used as was for preparation for reformed pigments.

Reformed Pigment 20 g of BLACK PEARLS™ 700 carbon black was added to a 500 ml stainless steel beaker. 20 g of the resin was dissolved in 132 g of THF and the thus-obtained solution was added to the carbon black in the stainless steel beaker together with 48 g of THF and 20 g of water. The mixture was stirred with a propeller blade and a rotor stator and heated to 55° C. 0.25 g of sodium nitrite was dissolved in 16 g of water in another container. 0.35 g of methanesulfonic acid was added to the stirred mixture and the sodium nitrite solution was dripped thereto in five minutes. The mixture was maintained by stirring for two hours at 55° C. Next, the resultant mixture was added to and stirred in a polyethylene container having 800 mL of THF by a hand method. The thus-obtained solid portion was collected by centrifugal followed by washing with THF twice. The solid portion was dispersed in 500 mL of water having a pH of 9 for 30 minutes by using a sonic probe. The thus-produced dispersion material was filtered with a sieve having an opening size of 20 micron and diafiltrated by the amount (10 times: about 5 litter) of water for size classification. Thus, a self-dispersion pigment dispersion element 3-4 having a benzene tricarboxylic acid group as hydrophilic group with a pigment concentration of 16% was obtained.

Examples 1 to 22 and Comparative Examples 1 to 9

Preparation of Ink for Inkjet Recording

Example 1

The following recipe was stirred for one hour to be uniformly mixed. The-thus obtained liquid dispersion was filtrated under pressure with a polyvinilydene fluoride membrane filter having an average hole diameter of 5.0 μm to remove coarse particles and dust to obtain ink of Example 1.

| | |
|---|---|
| Pigment liquid dispersion 1-1 (Pigment concentration: 16%): | 50.0 parts |
| Preparation Example 1 of Aqueous Solution: | 10.0 parts |
| AEPD: | 0.1 parts |
| Glycerin: | 10.0 parts |
| 1,3-butane diol: | 20.0 parts |
| Distilled water | 9.9 parts |

Examples 2 to 22 and Comparative Examples 1 to 9

Ink of Examples 2 to 22 and Comparative Examples 1 to 9 were manufactured in the same manner as in Example 1 except that the materials shown in each column of Examples 2 to 22 and Comparative Examples 1 to 9 in Table 2. The values in Tables 2-1 to 2-4 are represented in % by weight.

TABLE 2-1

| | | Example | | | | | | |
|---|---|---|---|---|---|---|---|---|
| | | 1 | 2 | 3 | 4 | 5 | 6 | 7 |
| Colorant | Pigment dispersion element 1-1 | 50.0 | | | | | | |
| | Pigment dispersion element 1-2 | | 30.0 | | | | | |
| | Pigment dispersion element 1-3 | | | | 50.0 | | | |
| | Pigment dispersion element 1-4 | | | | | 30.0 | | |
| | Pigment dispersion element 1-5 | | | | | | | |
| | Pigment dispersion element 1-6 | | | | | | | |
| | Pigment dispersion element 2-1 | | | | | | | |
| | Pigment dispersion element 2-2 | | | | | | | |
| | Pigment dispersion element 3-1 | | | | | | | |
| | Pigment dispersion element 3-2 | | 50.0 | | | | 50.0 | 50.0 |
| | Pigment dispersion element 3-3 | | | | | | | |
| | Pigment dispersion element 3-4 | | | | | | | |
| | Dye C.I. Direct Black 154 | | | | | | | |
| Additive | Preparation Example 1 of aqueous solution | 10.0 | 10.0 | 10.0 | 10.0 | 10.0 | 10.0 | 10.0 |
| | Preparation Example 2 of aqueous solution | | | | | | | |
| | Preparation Example 3 of aqueous solution | | | | | | | |
| | Preparation Example 4 of aqueous solution | | | | | | | |
| | Preparation Example 5 of aqueous solution | | | | | | | |
| pH regulator | 10% aqueous solution of NaOH | | | | | | 0.1 | 0.1 |
| | 2-amino-2-ethyl-1,3-propane diol | 0.1 | 0.1 | 0.1 | 0.1 | 0.1 | 0.1 | |
| Hydro-soluble Organic solvent | Glycerin | 10.0 | 10.0 | 10.0 | 10.0 | 10.0 | 10.0 | 10.0 |
| | 1,3-butane diol | 20.0 | 20.0 | 20.0 | 20.0 | 20.0 | 20.0 | 20.0 |
| | Trimethylol propane | | | | | | | |
| | 2-pyrolidone | | | | | | | |
| Solvent | Distilled water | Rest | Rest | Rest | Rest | Rest | Rest | Rest |
| | Total | 100.0 | 100.0 | 100.0 | 100.0 | 100.0 | 100.0 | 100.0 |

|  |  | Example | | | | | | |
|---|---|---|---|---|---|---|---|---|
|  |  | 8 | 9 | 10 | 11 | 12 | 13 | 14 |
| Colorant | Pigment dispersion element 1-1 | | | | | | | |
|  | Pigment dispersion element 1-2 | | | | | | | |
|  | Pigment dispersion element 1-3 | | | | | | | |
|  | Pigment dispersion element 1-4 | | | | | | | |
|  | Pigment dispersion element 1-5 | | | | | | | |
|  | Pigment dispersion element 1-6 | | | | | | | |
|  | Pigment dispersion element 2-1 | | | | | | | |
|  | Pigment dispersion element 2-2 | | | | | | | |
|  | Pigment dispersion element 3-1 | | | | | | | |
|  | Pigment dispersion element 3-2 | 50.0 | 50.0 | | | | | |
|  | Pigment dispersion element 3-3 | | | | | | | |
|  | Pigment dispersion element 3-4 | | | 50.0 | 50.0 | 50.0 | 50.0 | 50.0 |
|  | Dye C.I. Direct Black 154 | | | | | | | |
| Additive | Preparation Example 1 of aqueous solution | 10.0 | 10.0 | | | | 0.6 | 0.4 |
|  | Preparation Example 2 of aqueous solution | | | 16.8 | 15.3 | | | |
|  | Preparation Example 3 of aqueous solution | | | | | | | 0.4 |
|  | Preparation Example 4 of aqueous solution | | | | | | | |
|  | Preparation Example 5 of aqueous solution | | | | | | | |
| pH regulator | 10% aqueous solution of NaOH | | | | | | | |
|  | 2-amino-2-ethyl-1,3-propane diol | 0.1 | | | | | | |
| Hydro-soluble Organic solvent | Glycerin | 10.0 | 10.0 | 10.0 | 10.0 | 10.0 | 10.0 | |
|  | 1,3-butane diol | 20.0 | 20.0 | 20.0 | 20.0 | 20.0 | 20.0 | 30.0 |
|  | Trimethylol propane | | | | | | | |
|  | 2-pyrolidone | | | | | | | |
| Solvent | Distilled water | Rest | Rest | Rest | Rest | Rest | Rest | Rest |
|  | Total | 100.0 | 100.0 | 100.0 | 100.0 | 100.0 | 100.0 | 100.0 |

|  |  | Example | | | | | | | |
|---|---|---|---|---|---|---|---|---|---|
|  |  | 15 | 16 | 17 | 18 | 19 | 20 | 21 | 22 |
| Colorant | Pigment dispersion element 1-1 | | | | | | | | |
|  | Pigment dispersion element 1-2 | | | | | | | | |
|  | Pigment dispersion element 1-3 | | | | | | | | |
|  | Pigment dispersion element 1-4 | | | | | | | | |
|  | Pigment dispersion element 1-5 | 50.0 | | | | | | | |
|  | Pigment dispersion element 1-6 | | | | | 50.0 | | | |
|  | Pigment dispersion element 2-1 | | | | | | | 50.0 | |
|  | Pigment dispersion element 2-2 | | | 50.0 | | | | | |
|  | Pigment dispersion element 3-1 | | | | | | 50.0 | | |

-continued

|  |  | Example | | | | | | | |
|---|---|---|---|---|---|---|---|---|---|
|  |  | 15 | 16 | 17 | 18 | 19 | 20 | 21 | 22 |
|  | Pigment dispersion element 3-2 |  |  |  |  |  |  | 50.0 |  |
|  | Pigment dispersion element 3-3 | 50.0 |  |  |  |  |  |  |  |
|  | Pigment dispersion element 3-4 |  |  |  |  |  |  |  | 50.0 |
|  | Dye C.I. Direct Black 154 |  |  |  |  |  |  |  |  |
| Additive | Preparation Example 1 of aqueous solution |  |  |  |  |  |  |  |  |
|  | Preparation Example 2 of aqueous solution |  |  |  |  |  |  |  |  |
|  | Preparation Example 3 of aqueous solution | 0.4 | 0.4 | 0.4 | 0.4 | 0.4 | 0.4 | 0.4 | 0.4 |
|  | Preparation Example 4 of aqueous solution |  |  |  |  |  |  |  |  |
|  | Preparation Example 5 of aqueous solution |  |  |  |  |  |  |  |  |
| pH regulator | 10% aqueous solution of NaoH |  |  |  |  |  |  |  |  |
|  | 2-amino-2-ethyl-1,3-propane diol |  |  |  |  |  |  |  |  |
| Hydro-soluble Organic solvent | Glycerin | 20.0 | 10.0 | 10.0 | 10.0 | 10.0 | 10.0 | 10.0 | 10.0 |
|  | 1,3-butane diol |  | 20.0 | 20.0 | 20.0 | 20.0 | 20.0 | 20.0 | 20.0 |
|  | Trimethylol propane | 5.0 |  |  |  |  |  |  |  |
|  | 2-pyrolidone | 5.0 |  |  |  |  |  |  |  |
| Solvent | Distilled water | Rest | Rest | Rest | Rest | Rest | Rest | Rest | Rest |
|  | Total | 100.0 | 100.0 | 100.0 | 100.0 | 100.0 | 100.0 | 100.0 | 100.0 |

|  |  | Comparative Example | | | | | | | | |
|---|---|---|---|---|---|---|---|---|---|---|
|  |  | 1 | 2 | 3 | 4 | 5 | 6 | 7 | 8 | 9 |
| Colorant | Pigment dispersion element 1-1 | 50.0 | 50.0 |  |  |  |  |  |  |  |
|  | Pigment dispersion element 1-2 |  |  | 50.0 |  |  |  |  |  |  |
|  | Pigment dispersion element 1-3 |  |  |  | 50.0 |  |  |  |  |  |
|  | Pigment dispersion element 1-4 |  |  |  |  | 50.0 |  |  |  |  |
|  | Pigment dispersion element 1-5 |  |  |  |  |  |  |  |  |  |

-continued

| | | Comparative Example | | | | | | | | |
|---|---|---|---|---|---|---|---|---|---|---|
| | | 1 | 2 | 3 | 4 | 5 | 6 | 7 | 8 | 9 |
| | Pigment dispersion element 1-6 | | | | | | | | | |
| | Pigment dispersion element 2-1 | | | | | | | | | |
| | Pigment dispersion element 2-2 | | | | | | | | | |
| | Pigment dispersion element 3-1 | | | | | | | 50.0 | | |
| | Pigment dispersion element 3-2 | | | | | | | | | |
| | Pigment dispersion element 3-3 | | | | | | | | | |
| | Pigment dispersion element 3-4 | | | | | | | | | |
| | Dye C.I. Direct Black 154 | 8.0 | | | | | | | 8.0 | 8.0 |
| Additive | Preparation Example 1 of aqueous solution | 10.0 | | | | | | | 10.0 | |
| | Preparation Example 2 of aqueous solution | | | | | | | | | |
| | Preparation Example 3 of aqueous solution | 0.4 | | | | | | | | |
| | Preparation Example 4 of aqueous solution | | | 10.0 | | | | 10.0 | | |
| | Preparation Example 5 of aqueous solution | | | | | | | | | 10.0 |
| pH regulator | 10% aqueous solution of NaOH | | | | 0.1 | | 0.1 | 0.1 | | |
| | 2-amino-2-ethyl-1,3-propane diol | 0.1 | 0.1 | | | 0.1 | | | | |
| Hydro-soluble Organic solvent | Glycerin | 10.0 | 10.0 | 10.0 | 10.0 | 10.0 | 10.0 | 10.0 | 10.0 | 10.0 |
| | 1,3-butane diol | 20.0 | 20.0 | 20.0 | 20.0 | 20.0 | 20.0 | 20.0 | 20.0 | 20.0 |
| | Trimethylol propane | | | | | | | | | |
| | 2-pyrolidone | | | | | | | | | |
| Solvent | Distilled water | Rest | Rest | Rest | Rest | Rest | Rest | Rest | Rest | Rest |
| | Total | 100.0 | 100.0 | 100.0 | 100.0 | 100.0 | 100.0 | 100.0 | 100.0 | 100.0 |

The inks were measured and evaluated for various properties as follows: The results are shown in Table 3.

pH of Each Ink pH of each ink at 25.0° C. was measured by a pH meter (HM-30R, manufactured by DKK-TOA CORPORATION).

Evaluation of Printing of Each Ink

An inkjet printer (IPSIO GXe 5500, manufactured by Ricoh Company LTD.) was used to eject ink in such a manner that the same amount of the ink was ejected and attached to a recording medium by fluctuating the drive voltage of piezoelectric elements to conduct the following printing evaluation.

Image Density and Strike-Through

A chart having general symbols of 64 point JIS X 0208 (1997), 2223 formed by Microsoft Word 2003 was printed on MyPaper (manufactured by Ricoh Company Ltd.) by using each ink and thereafter the colors of the symbol portions were measured for evaluating the image density.

The printing mode was: "Plain Paper—Clean" by a driver installed in the printer. The image density of each color was evaluated according to the following criteria. For evaluation, the four measuring points per color per chart were measured once and the average of the four points were determined as the measuring results. Incidentally, the symbols of JIS X 0208 (1997), 2223 had squares for the exterior and the inside thereof was entirely painted by ink.

In addition, the image density (Optical Density (OD) value) of the symbol portion and the OD value of the non-image portion of the paper were measured by using X-Rite 938.

The OD value obtained by subtracting the OD value of the non-image portion from the OD value of the symbol portion was defined as the strike-through density, which was evaluated according to the same criteria.

* My Paper (quality paper): manufactured by Ricoh Company LTD.
  Basis weight: 69.6 g/m$^2$;
  Sizing test: 23.2 seconds;
  Air permeability: 21.0 seconds;
  Amount of Ca ion: $4.3 \times 10^4$ (g/g)

Image Density (OD Value) Evaluation Criteria
A: OD Value
  Black: 1.35 or higher
  Yellow: 0.80 or higher
  Magenta: 0.95 or higher
  Cyan: 1.05 or higher
B: OD Value
  Black: 1.25 to less than 1.35
  Yellow: 0.75 to less than 0.80
  Magenta: 0.85 to less than 0.95
  Cyan: 0.95 to less than 1.05
C: OD Value
  Black: 1.15 to less than 1.25
  Yellow: 0.70 to less than 0.75
  Magenta: 0.75 to less than 0.85
  Cyan: 0.85 to less than 0.95
D: OD Value
  Black: less than 1.15
  Yellow: less than 0.70
  Magenta: less than 0.75
  Cyan: less than 0.85

Strike-Through (OD Value) Evaluation Criteria
A: OD Value
  Black: less than 0.10
  Yellow: less than 0.08
  Magenta: less than 0.09
  Cyan: less than 0.10
B: OD Value
  Black: 0.10 to less than 0.20
  Yellow: 0.08 to less than 0.16
  Magenta: 0.09 to less than 0.18
  Cyan: 0.10 to less than 0.20
C: OD Value
  Black: 0.20 to less than 0.50
  Yellow: 0.16 to less than 0.40
  Magenta: 0.18 to less than 0.40
  Cyan: 0.20 to less than 0.50
D: OD Value
  Black 0.50 or higher
  Yellow: 0.40 or higher
  Magenta: 0.40 or higher
  Cyan: 0.50 or higher Ejection Reliability of Continuous Printing In the MM environment (24.0° C. to 26.0° C., 45% RH to 55% RH), a chart having general symbols of 64 point JIS X 0208 (1997), 2223 formed by Microsoft Word 2003 was printed with a run length of 100 sheets on MyPaper (manufactured by Ricoh Company Ltd.) using an inkjet printer filled with each ink. During printing, if the dot missing or ejection deviation was seen in the chart, the printer nozzle was cleaned back to normal printing as restoring operation. The total number of times of cleaning was counted. The ejection stability of each ink set was evaluated by the total number of times of cleaning according to the following criteria.

Evaluation Criteria
  AA: No Cleaning
  A: Cleaning once
  B: Cleaning twice to less than five times
  D: Cleaning five times or more Ejection Reliability after being Left An inkjet printer left in the HL environment (31.5° C. to 33.5° C., 10% RH to 20% RH) for three hours or more was filled with each ink and a nozzle check pattern including solid printing portion was printed on a single sheet of MyPaper (manufactured by Ricoh Company Ltd.) to confirm that no dot missing occurred.

Thereafter, the printer was left in the HL environment (31.5° C. to 33.5° C., 10% RH to 20% RH) for six days, the nozzle check pattern was printed on was printed on a single sheet of MyPaper (manufactured by Ricoh Company Ltd.) to check whether there was dot missing or ejection deviation.

If the dot missing or ejection deviation was seen in the nozzle check pattern, the printer nozzle was cleaned back to normal printing as restoring operation. The total number of cleaning was counted. The ejection stability of each ink was evaluated by the total number of times of cleaning according to the following criteria.

Evaluation Criteria
  AA: No Cleaning
  A: Cleaning once
  B: Cleaning twice to less than five times
  D: Cleaning five times or more

TABLE 3

| | Ink pH | Image density OD value | Evaluation | Strike-through OD value | Evaluation | Continuous printing ejection reliability | Ejection reliability after being left |
|---|---|---|---|---|---|---|---|
| Example 1 | 8.5 | 1.39 | A | 0.08 | A | AA | AA |
| Example 2 | 8.0 | 1.38 | A | 0.09 | A | AA | AA |
| Example 3 | 8.5 | 1.07 | A | 0.08 | A | AA | AA |
| Example 4 | 8.6 | 0.95 | A | 0.07 | A | AA | AA |
| Example 5 | 8.4 | 0.82 | A | 0.05 | A | AA | AA |
| Example 6 | 11.0 | 1.38 | A | 0.09 | A | AA | A |
| Example 7 | 9.5 | 1.37 | A | 0.08 | A | AA | AA |
| Example 8 | 7.3 | 1.38 | A | 0.09 | A | AA | AA |

TABLE 3-continued

| | Ink pH | Image density OD value | Evaluation | Strike-through OD value | Evaluation | Continuous printing ejection reliability | Ejection reliability after being left |
|---|---|---|---|---|---|---|---|
| Example 9 | 6.7 | 1.39 | A | 0.09 | A | AA | A |
| Example 10 | 6.8 | 1.42 | A | 0.07 | A | A | A |
| Example 11 | 6.7 | 1.40 | A | 0.08 | A | AA | A |
| Example 12 | 6.9 | 1.38 | A | 0.08 | A | AA | A |
| Example 13 | 6.9 | 1.35 | A | 0.09 | A | AA | A |
| Example 14 | 6.5 | 1.38 | A | 0.09 | A | A | A |
| Example 15 | 6.5 | 1.40 | A | 0.08 | A | A | A |
| Example 16 | 6.9 | 1.36 | A | 0.10 | B | AA | B |
| Example 17 | 6.9 | 1.39 | A | 0.11 | B | A | A |
| Example 18 | 6.7 | 1.37 | A | 0.11 | B | A | A |
| Example 19 | 6.4 | 1.26 | B | 0.09 | A | AA | B |
| Example 20 | 6.6 | 1.29 | B | 0.08 | A | AA | B |
| Example 21 | 6.8 | 1.26 | B | 0.09 | A | A | B |
| Example 22 | 6.8 | 1.32 | B | 0.08 | A | A | B |
| Comparative Example 1 | 8.8 | 1.21 | C | 0.11 | B | B | B |
| Comparative Example 2 | 7.9 | 1.33 | B | 0.20 | C | C | B |
| Comparative Example 3 | 8.2 | 1.29 | B | 0.19 | B | C | C |
| Comparative Example 4 | 8.5 | 0.94 | C | 0.20 | C | B | C |
| Comparative Example 5 | 9.0 | 0.90 | B | 0.20 | C | B | B |
| Comparative Example 6 | 8.8 | 0.79 | B | 0.17 | C | B | B |
| Comparative Example 7 | 9.0 | 1.14 | D | 0.21 | C | B | B |
| Comparative Example 8 | 6.5 | 1.29 | B | 0.20 | C | C | B |
| Comparative Example 9 | 6.6 | 1.25 | B | 0.24 | C | B | B |

According to embodiments of the present disclosure, an ink for inkjet recording is provided which produces images having a high density on plain paper, reduces the occurrence of strike-through of images, and has a high ejection reliability.

Having now fully described embodiments of the present invention, it will be apparent to one of ordinary skill in the art that many changes and modifications can be made thereto without departing from the spirit and scope of embodiments of the invention as set forth herein.

What is claimed is:

1. An ink for inkjet recording comprising:
   water;
   an organic solvent;
   a pigment; and
   a compound represented by the following Chemical formula 1:

Chemical formula 1

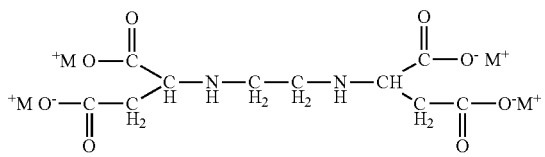

where M$^+$'s each, independently represent protons, cations of alkali metals, ammonium ions, or organic ammonium ions, wherein the pigment satisfies one of the following I to III:
   I. the pigment which is dispersed by a dispersant having one or more kinds of hydrophilic group;
   II. the pigment which is covered with a resin having one or more kinds of hydrophilic group; and
   III. the pigment to which one or more kinds of hydrophilic group, an atomic group having one or more kinds of hydrophilic group, or a resin having one or more kinds of hydrophilic group is bonded, and wherein the pH of the ink for inkjet recording ranges from 7.0 to 10.0 at 25° C.

2. The ink for inkjet recording according to claim 1, wherein the hydrophilic group is a phosphoric acid group or a phosphonic acid group.

3. The ink for inkjet recording according to claim 1, wherein the hydrophilic group is a bisphosphonic acid group.

4. The ink for inkjet recording according to claim 1, wherein M$^+$ in Chemical formula 1 is a proton or an organic ammonium ion.

5. The ink for inkjet recording according to claim 1, wherein the compound represented by Chemical formula 1 accounts for 0.1% by weight to 15.0% by weight in the ink for ink for inkjet recording.

6. An ink container comprising:
   an ink accommodating unit to accommodate the ink for inkjet recording of claim 1.

7. An inkjet recording device comprising:
   the ink container of claim 6.

* * * * *